United States Patent
Tai et al.

(10) Patent No.: US 11,403,876 B2
(45) Date of Patent: Aug. 2, 2022

(54) IMAGE PROCESSING METHOD AND APPARATUS, FACIAL RECOGNITION METHOD AND APPARATUS, AND COMPUTER DEVICE

(71) Applicant: Tencent Technology (Shenzhen) Company Limited, Shenzhen (CN)

(72) Inventors: Ying Tai, Shenzhen (CN); Yun Cao, Shenzhen (CN); Shouhong Ding, Shenzhen (CN); Shaoxin Li, Shenzhen (CN); Chengjie Wang, Shenzhen (CN); Jilin Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 94 days.

(21) Appl. No.: 16/991,878

(22) Filed: Aug. 12, 2020

(65) Prior Publication Data
US 2020/0372243 A1    Nov. 26, 2020

Related U.S. Application Data

(63) Continuation of application No. PCT/CN2019/085031, filed on Apr. 29, 2019.

(30) Foreign Application Priority Data

Jun. 11, 2018 (CN) .......................... 201810594760.8

(51) Int. Cl.
G06T 5/20 (2006.01)
G06V 10/82 (2022.01)
G06V 40/16 (2022.01)

(52) U.S. Cl.
CPC .............. G06V 40/171 (2022.01); G06T 5/20 (2013.01); G06V 10/82 (2022.01)

(58) Field of Classification Search
CPC .......... G06V 40/171; G06N 3/04; G06T 5/20
See application file for complete search history.

(56) References Cited

U.S. PATENT DOCUMENTS

2013/0194455 A1 * 8/2013 Bigioi ................ H04N 5/23219
                                                                    348/239
2021/0219839 A1 * 7/2021 Kim ....................... G16H 20/40

FOREIGN PATENT DOCUMENTS

CN        107085716 A   *   8/2017
CN        107085716 A       8/2017
(Continued)

OTHER PUBLICATIONS

Jie Hu, Li Shen, Samuel Albanie, Gang Sun, and Enhua Wu, "Squeeze-and-Excitation Networks", arXiv: 1709.01507 [cs.CV], 2017 (Year: 2017).*

(Continued)

*Primary Examiner* — Bernard Krasnic
(74) *Attorney, Agent, or Firm* — Crowell & Moring LLP

(57) ABSTRACT

This application relates to an image processing method and apparatus, a facial recognition method and apparatus, a computer device, and a readable storage medium. The image processing method includes: obtaining a target image comprising an object wearing glasses; inputting the target image to a glasses-removing model comprising a plurality of sequentially connected convolution squeeze and excitation networks; obtaining feature maps of feature channels of the target image through convolution layers of the convolution squeeze and excitation networks; obtaining global information of the feature channels according to the feature maps through squeeze and excitation layers of the convolution squeeze and excitation networks, learning the global information, and generating weights of the feature channels; weighting the feature maps of the feature channels according to the weights through weighting layers of the convolution (Continued)

squeeze and excitation networks, respectively, and generating weighted feature maps; and generating a glasses-removed image corresponding to the target image according to the weighted feature maps through the glasses-removing model. The glasses in the image can be effectively removed using the method.

20 Claims, 11 Drawing Sheets

(56) References Cited

FOREIGN PATENT DOCUMENTS

| | | | |
|---|---|---|---|
| CN | 107220600 A | | 9/2017 |
| CN | 107392973 A | | 11/2017 |
| CN | 107679483 A | * | 2/2018 |
| CN | 107679483 A | | 2/2018 |
| CN | 107945118 A | | 4/2018 |
| CN | 108846355 A | | 11/2018 |
| CN | 109934062 A | * | 6/2019 |

OTHER PUBLICATIONS

Diego Gomez Mosquera, "GANs from Scratch 1: A deep introduction. With code in PyTorch and Tensorflow", AI Society medium, Feb. 1, 2018 (Year: 2018).*

Chenyu Wu, Ce Liu, Heung-Yueng Shum, Ying-Qing Xu, and Zhengyou Zhang, "Automatic eyeglasses removal from face images," IEEE Transactions on Pattern Analysis and Machine Intelligence, vol. 26, No. 3, pp. 322-336, Mar. 2004, doi: 10.1109/TPAMI.2004.1262319 (Year: 2004).*

J. Pu, X. Chen, L. Zhang, Q. Zhou and Y. Zhao, "Removing rain based on a cycle generative adversarial network," 2018 13th IEEE Conference on Industrial Electronics and Applications (ICIEA), 2018, pp. 621-626, doi: 10.1109/ICIEA.2018.8397790 (Year: 2018).*

Chinese Office Action for Patent Application No. CN 201810594760.8 dated Jul. 19, 2019; 7 pages.

Chinese Office Action for Patent Application No. CN 201810594760.8 dated Nov. 15, 2019; 3 pages.

Chinese Office Action for Patent Application No. CN 201810594760.8 dated Dec. 17, 2019; 3 pages.

International Search Report and Written Opinion for International Application No. PCT/CN2019/085031 dated Jul. 8, 2019; 12 pages.

* cited by examiner

User

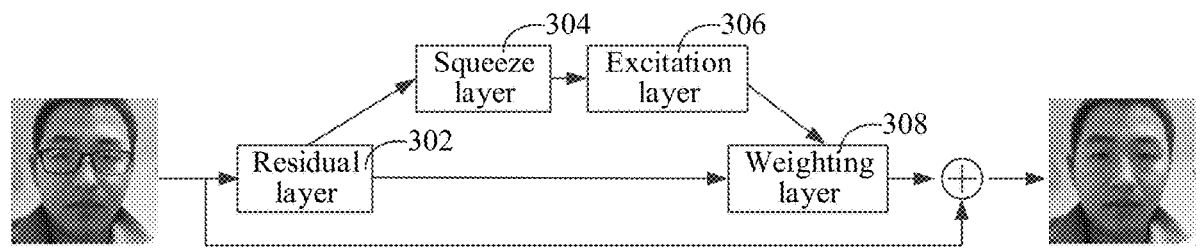
FIG. 3
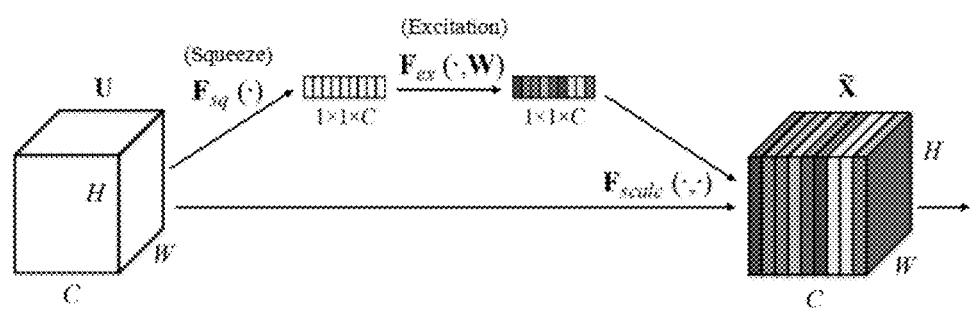
FIG. 4
| 1 | 8 | 4 | 5 | 3 | 7 |
|---|---|---|---|---|---|
| 5 | 1 | 6 | 9 | 1 | 1 |
| 8 | 12 | 2 | 2 | 1 | 10 |
| 4 | 1 | 6 | 11 | 3 | 4 |
| 1 | 3 | 8 | 1 | 9 | 7 |
| 6 | 4 | 1 | 6 | 5 | 7 |
Squeeze → z
FIG. 5

IMAGE PROCESSING METHOD AND APPARATUS, FACIAL RECOGNITION METHOD AND APPARATUS, AND COMPUTER DEVICE

RELATED APPLICATION

This application is a continuation application of the International PCT Application No. PCT/CN2019/085031, filed with the National Intellectual Property Administration, PRC on Apr. 29, 2019 which claims priority to Chinese Patent Application No. 201810594760.8, entitled "IMAGE PROCESSING METHOD AND APPARATUS, FACIAL RECOGNITION METHOD AND APPARATUS, AND COMPUTER DEVICE" and filed with the National Intellectual Property Administration, PRC on Jun. 11, 2018, which are incorporated herein by reference in their entireties.

FIELD OF THE TECHNOLOGY

This application relates to the field of image processing technologies, and in particular, to a method and apparatus, a facial recognition method and apparatus, a computer device, and a readable storage medium for image processing.

BACKGROUND OF THE DISCLOSURE

As the application scope of image processing technologies becomes increasingly wide, removing useless information in an image by using an image processing technology, to obtain a required image becomes a research hotspot of current image processing. For example, in an identity verification system such as a security verification system of public transportation or a credit card verification system, when a to-be-verified person wears glasses, the person usually needs to be verified after the glasses are removed from a captured face image.

However, the network learning capability of a conventional glasses-removing model is relatively low. Consequently, it is difficult to ensure that a glasses-removed face image effectively represents a related feature of an original image. As a result, the degree of restoration of the glasses-removed face image is low.

SUMMARY

Based on this, a method and apparatus, a facial recognition method and apparatus, a computer device, and a readable storage medium for image processing are provided, to resolve the technical problem that the restoration degree based on the conventional glasses-removing model is low.

According to one aspect, an image processing method is provided, including:

obtaining a target image comprising an object wearing glasses;

inputting the target image to a glasses-removing model which is trained based on a generative adversarial network, the glasses-removing model including a plurality of sequentially connected convolution squeeze and excitation networks;

obtaining feature maps of feature channels of the target image through convolution layers of the convolution squeeze and excitation networks;

obtaining global information of the feature channels according to the feature maps through squeeze and excitation layers of the convolution squeeze and excitation networks, learning the global information, and generating weights of the feature channels;

weighting the feature maps of the feature channels according to the weights through weighting layers of the convolution squeeze and excitation networks, respectively, and generating weighted feature maps; and generating a glasses-removed image corresponding to the target image according to the weighted feature maps through the glasses-removing model.

According to one aspect, a facial recognition method is provided, including:

obtaining a target image comprising a face wearing glasses from a candidate to-be-recognized face image;

inputting the target image to a glasses-removing model which is trained based on a generative adversarial network, the glasses-removing model including a plurality of sequentially connected convolution squeeze and excitation networks;

obtaining feature maps of feature channels of the target image through convolution layers of the convolution squeeze and excitation networks;

obtaining global information of the feature channels according to the feature maps through squeeze and excitation layers of the convolution squeeze and excitation networks, learning the global information, and generating weights of the feature channels;

weighting the feature maps of the feature channels according to the weights through weighting layers of the convolution squeeze and excitation networks, respectively, and generating weighted feature maps;

obtaining a glasses-removed face image corresponding to the target image according to the weighted feature maps through the glasses-removing model; and performing matching between the glasses-removed face image and a preset face image library and generating a facial recognition result according to a matching result.

According to one aspect, an image processing apparatus is provided, including:

an image obtaining module, configured to obtain a target image comprising an object wearing glasses;

an input module, configured to input the target image to a glasses-removing model which is trained based on a generative adversarial network, the glasses-removing model including a plurality of sequentially connected convolution squeeze and excitation networks;

a convolution module, configured to obtain feature maps of feature channels of the target image through convolution layers of the convolution squeeze and excitation networks;

a weight learning module, configured to obtain global information of the feature channels according to the feature maps through squeeze and excitation layers of the convolution squeeze and excitation networks, learn the global information, and generate weights of the feature channels;

a weighting module, configured to weight the feature maps of the feature channels according to the weights through weighting layers of the convolution squeeze and excitation networks, respectively, and generate weighted feature maps; and a generating module, configured to generate a glasses-removed image corresponding to the target image according to the weighted feature maps through the glasses-removing model.

According to one aspect, a facial recognition apparatus is provided, including:

a target image obtaining module, configured to obtain a target image comprising a face wearing glasses from a candidate to-be-recognized face image;

a target image input module, configured to input the target image to a glasses-removing model which is trained based on a generative adversarial network, the glasses-removing model including a plurality of sequentially connected convolution squeeze and excitation networks; a feature convolution module, configured to obtain feature maps of feature channels of the target image through convolution layers of the convolution squeeze and excitation networks;

a feature weight learning module, configured to obtain global information of the feature channels according to the feature maps through squeeze and excitation layers of the convolution squeeze and excitation networks, learn the global information, and generate weights of the feature channels;

a feature weighting module, configured to weight the feature maps of the feature channels according to the weights through weighting layers of the convolution squeeze and excitation networks, respectively, and generate weighted feature maps;

a face image generating module, configured to obtain a glasses-removed face image corresponding to the target image according to the weighted feature maps through the glasses-removing model; and a matching module, configured to perform matching between the glasses-removed face image and a preset face image library and generate a facial recognition result according to a matching result.

According to one aspect, a computer device is provided, including a memory and a processor, the memory storing a computer program, and the processor, when executing the computer program, implementing the following operations:

obtaining a target image comprising an object wearing glasses;

inputting the target image to a glasses-removing model which is trained based on a generative adversarial network, the glasses-removing model including a plurality of sequentially connected convolution squeeze and excitation networks;

obtaining feature maps of feature channels of the target image through convolution layers of the convolution squeeze and excitation networks;

obtaining global information of the feature channels according to the feature maps through squeeze and excitation layers of the convolution squeeze and excitation networks, learning the global information, and generating weights of the feature channels;

weighting the feature maps of the feature channels according to the weights through weighting layers of the convolution squeeze and excitation networks, respectively, and generating weighted feature maps; and generating a glasses-removed image corresponding to the target image according to the weighted feature maps through the glasses-removing model.

According to one aspect, a computer-readable storage medium is provided, storing a computer program, the computer program, when being executed by a processor, implementing the following operations:

obtaining a target image comprising an object wearing glasses;

inputting the target image to a glasses-removing model which is trained based on a generative adversarial network, the glasses-removing model including a plurality of sequentially connected convolution squeeze and excitation networks;

obtaining feature maps of feature channels of the target image through convolution layers of the convolution squeeze and excitation networks;

obtaining global information of the feature channels according to the feature maps through squeeze and excitation layers of the convolution squeeze and excitation networks, learning the global information, and generating weights of the feature channels;

weighting the feature maps of the feature channels according to the weights through weighting layers of the convolution squeeze and excitation networks, respectively, and generating weighted feature maps; and generating a glasses-removed image corresponding to the target image according to the weighted feature maps through the glasses-removing model.

According to one aspect, a computer device is provided, including a memory and a processor, the memory storing a computer program, and the processor, when executing the computer program, implementing the following operations:

obtaining a target image comprising a face wearing glasses from a candidate to-be-recognized face image;

inputting the target image to a glasses-removing model which is trained based on a generative adversarial network, the glasses-removing model including a plurality of sequentially connected convolution squeeze and excitation networks;

obtaining feature maps of feature channels of the target image through convolution layers of the convolution squeeze and excitation networks;

obtaining global information of the feature channels according to the feature maps through squeeze and excitation layers of the convolution squeeze and excitation networks, learning the global information, and generating weights of the feature channels;

weighting the feature maps of the feature channels according to the weights through weighting layers of the convolution squeeze and excitation networks, respectively, and generating weighted feature maps;

obtaining a glasses-removed face image corresponding to the target image according to the weighted feature maps through the glasses-removing model; and performing matching between the glasses-removed face image and a preset face image library and generating a facial recognition result according to a matching result.

According to one aspect, a computer-readable storage medium is provided, storing a computer program, the computer program, when being executed by a processor, implementing the following operations:

obtaining a target image comprising a face wearing glasses from a candidate to-be-recognized face image;

inputting the target image to a glasses-removing model which is trained based on a generative adversarial network, the glasses-removing model including a plurality of sequentially connected convolution squeeze and excitation networks;

obtaining feature maps of feature channels of the target image through convolution layers of the convolution squeeze and excitation networks;

obtaining global information of the feature channels according to the feature maps through squeeze and excitation layers of the convolution squeeze and excitation networks, learning the global information, and generating weights of the feature channels;

weighting the feature maps of the feature channels according to the weights through weighting layers of the convolution squeeze and excitation networks, respectively, and generating weighted feature maps;

obtaining a glasses-removed face image corresponding to the target image according to the weighted feature maps through the glasses-removing model; and performing matching between the glasses-removed face image and a preset face image library and generating a facial recognition result according to a matching result.

According to the image processing method and apparatus, the facial recognition method and apparatus, the computer device, and the readable storage medium, a target image is obtained, and the target image is inputted to a glasses-removing model that is obtained through pre-training; because the glasses-removing model includes a plurality of sequentially connected convolution squeeze and excitation networks, feature maps of feature channels of the target image may be obtained through convolution layers of the convolution squeeze and excitation networks, then global information of the feature channels is obtained according to the feature maps through squeeze and excitation layers of the convolution squeeze and excitation networks, the global information is learned to generate weights of the feature channels, then the feature maps of the feature channels are weighted according to the weights through weighting layers of the convolution squeeze and excitation networks, respectively, weighted feature maps are generated, and finally a corresponding glasses-removed image is obtained according to the weighted feature maps through the glasses-removing model. In this way, the glasses-removing model keeps a relatively high learning capability, and therefore can fully learn the importance of different feature channels to obtain corresponding weights, thus suppressing ineffective or slightly effective features through weighting processing while enhancing effective features, effectively remove glasses in the target image, and ensure that key features of the target image can be restored from the glasses-removed image, thereby improving the restoration degree and authenticity of the glasses-removed image.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the related art may still derive other drawings from the accompanying drawings without creative efforts.

FIG. 3 is a schematic structural diagram of a convolution squeeze and excitation network according to an embodiment.

FIG. 4 is a schematic diagram of squeeze and excitation processing and weighting processing in a convolution squeeze and excitation network according to an embodiment.

FIG. 5 is a schematic diagram of squeezing a feature map according to an embodiment.

DESCRIPTION OF EMBODIMENTS

To make the objectives, the technical solutions, and the advantages of this application clearer, the following further describes this application in detail with reference to the accompanying drawings and the embodiments. It is to be understood that the specific embodiments described herein are only used to describe this application, instead of limiting this application.

Figure 1:
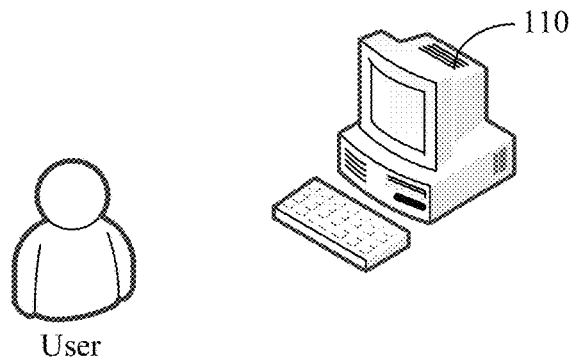
FIG. 1 is a diagram of an exemplary application environment of an image processing method and/or facial recognition method according to an embodiment.

FIG. 1 is a diagram of an application environment of an image processing method and/or facial recognition method according to an embodiment. Referring to FIG. 1, the image processing method is applied to an image processing system. The image processing system includes a terminal or server 110. The terminal may be a desktop terminal or a mobile terminal, and the mobile terminal may be at least one of a mobile phone, a tablet computer, a notebook computer, and the like. The server may be one server or a server cluster. The terminal or server 110 is provided with a glasses-removing model which is trained based on a generative adversarial network, the glasses-removing model includes a plurality of sequentially connected convolution squeeze and excitation networks, and glasses-removing processing can be performed on a target image through the convolution squeeze and excitation networks in the glasses-removing model. Further, the terminal or server 110 can further perform facial recognition, that is, after a glasses-removed face image is obtained based on the glasses-removing model, performing matching between the glasses-removed face image and a preset face image library, and generating a facial recognition result according to a matching result.

Figure 2:
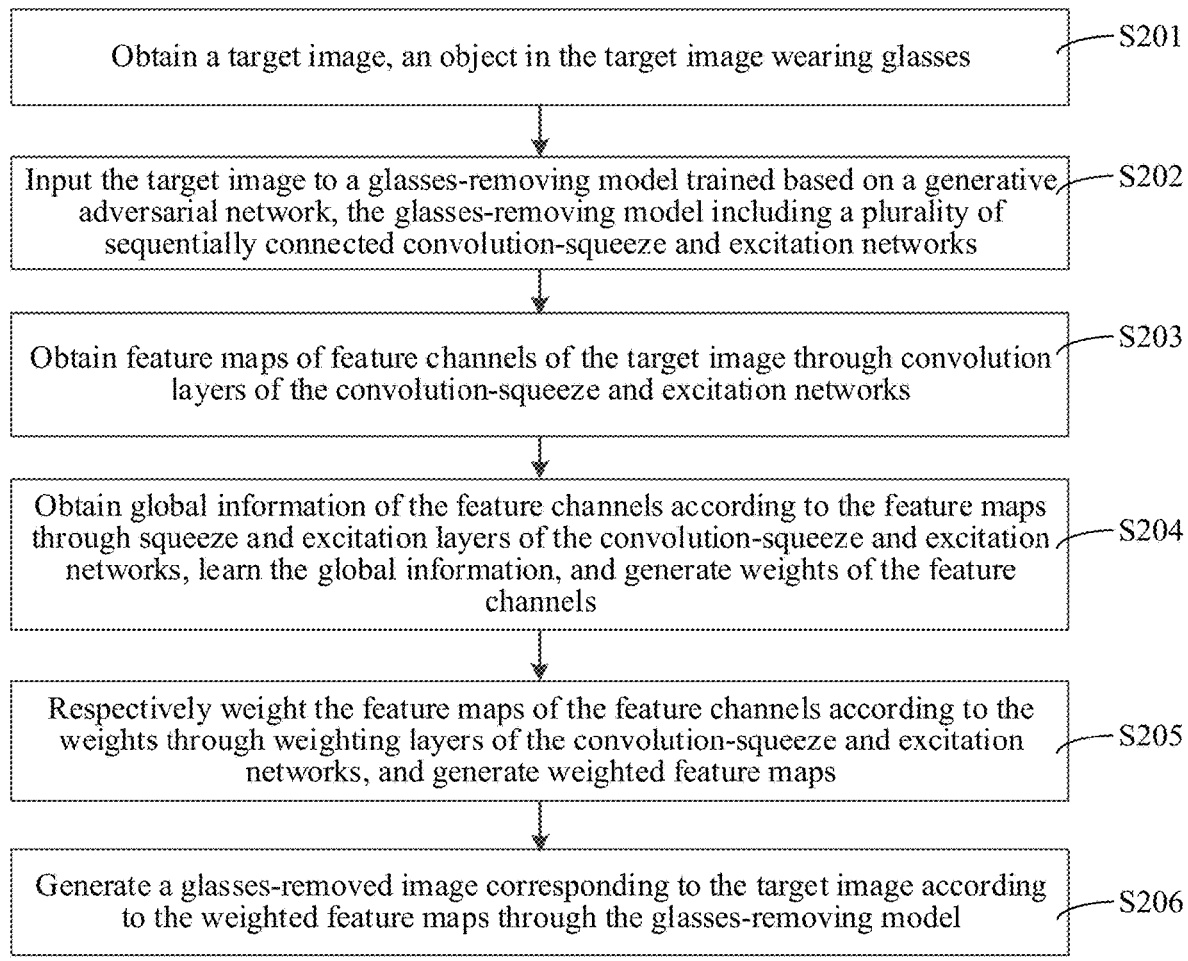
FIG. 2 is a schematic flowchart of an image processing method according to an embodiment.

As shown in FIG. 2, in an embodiment, an image processing method is provided. This embodiment is mainly described by using an example in which the method is applied to the terminal or server 110 in FIG. 1. Referring to FIG. 2, the image processing method includes the following operations:

S201. Obtain a target image, an object in the target image wearing glasses.

The target image refers to an image that carries glasses wearing information and on which glasses-removing processing needs to be performed. That is, the object in the target image wears glasses, and glasses-removing processing needs to be performed on the object. When the object is a face, the target image may be a face image of the face wearing glasses; and when the object is an eye portion, the target image may be an eye portion image obtained by dividing a face image of the face wearing glasses. For example, when glasses-removing processing is performed by using image processing software, the obtained target image is a face image inputted to the image processing software or an eye portion image obtained through division.

S202. Input the target image to a glasses-removing model which is trained based on a generative adversarial network, the glasses-removing model including a plurality of sequentially connected convolution squeeze and excitation networks.

In this embodiment, a glasses-removing model is obtained in advance based on training of a generative adversarial network, and the glasses-removing model may be a model obtained by removing glasses from a global face image, or may be a model obtained by removing glasses from a local eye portion image. It may be understood that, when the glasses-removing model is a model obtained by removing glasses from a global face image, the target image is a global face image; and when the glasses-removing model is a model obtained by removing glasses from a local eye portion image, the target image is a local eye portion image.

The generative adversarial network includes a generative network model and a discriminative network model, the generative network model is used for generating a fake picture as true as possible according to inputted data, and the discriminative network model is used for determining whether an inputted picture is a real picture or a fake picture. The training of the generative adversarial network means that the generative network model generates a picture to deceive the discriminative network model, and then the discriminative network model determines whether this picture and a corresponding real picture are real or fake. In a process of training the two models, the two models gain increasingly strong capabilities, and finally reach a steady state. The convolution squeeze and excitation network refers to a structure formed by at least one convolution layer, at least one squeeze and excitation layer, and at least one weighting layer of a convolutional neural network. A squeeze and excitation layer includes a squeeze module and an excitation module, the squeeze module is configured to process feature maps of feature channels to obtain global information of the feature channels, and the excitation module is configured to learn the global information to generate weights of the feature channels.

FIG. 3 shows a convolution squeeze and excitation network obtained by introducing a squeeze and excitation layer into a residual network, a residual layer 302 is connected to a squeeze layer 304 and a weighting layer 308, the squeeze layer 304 is further connected to an excitation layer 306, and the excitation layer 306 is further connected to the weighting layer 308.

Referring to FIG. 2 again, the convolution squeeze and excitation networks are configured to perform the following operations:

S203. Obtain feature maps of feature channels of the target image through convolution layers of the convolution squeeze and excitation networks.

In a possible implementation, convolution processing is performed on the inputted target image through convolution layers of the convolution squeeze and excitation networks, feature maps of feature channels of the target image are obtained, and the feature maps are inputted to squeeze and excitation layers of the convolution squeeze and excitation networks.

In each convolution layer, each piece of data exists in a three-dimensional form, and the data is considered as being formed by stacking two-dimensional pictures of a plurality of feature channels, where each two-dimensional picture is referred to as a feature map. As shown in FIG. 4, after convolution transform is performed on the target image, a three-dimensional matrix U whose size is W×H×C that may be alternatively referred to as C feature maps whose sizes are W×H is obtained, where C represents a quantity of feature channels.

S204. Obtain global information of the feature channels according to the feature maps through squeeze and excitation layers of the convolution squeeze and excitation networks, learn the global information, and generate weights of the feature channels.

The global information refers to a value distribution of the feature maps of the feature channels. In a possible implementation, the feature maps are compressed through the squeeze layer 304, to obtain the global information of the feature channels. As shown in FIG. 5, FIG. 5 shows a two-dimensional matrix corresponding to a feature map with the size of 6×6, and through compression processing, a feature map with the size of 1×1 representing the global information is obtained. A calculation manner is shown in Formula (1):

$$z_c = F_{sq}(u_c) = \frac{1}{W \times H} \sum_{i=1}^{W} \sum_{j=1}^{H} u_c(i, j) \tag{1}$$

where $z_c$ represents global information of a feature channel C; $F_{sq}$ represents a global information obtaining function; $u_c$ represents a two-dimensional matrix (feature map) corresponding to a feature channel C in a matrix U; i represents a row number in a W×H two-dimensional matrix; j represents a column number in the W×H two-dimensional matrix; and $u_c(i,j)$ represents a value of row i and column j in the two-dimensional matrix corresponding to the feature channel C.

In this embodiment, obtaining of the global information is actually to calculate an arithmetic average of feature values of all feature maps, and transform each two-dimensional matrix into a real number, so that location information as a whole of a channel feature map is fused, to avoid inaccurate evaluation when performing weight evaluation on a channel, due to an excessively small information extracting range in a local receptive field and an insufficient reference information amount which are caused by a size problem of a convolution kernel.

After obtaining the global information, the squeeze layer 304 inputs the global information to the excitation layer 306, the global information is learned through the excitation layer 306, and the weights of the feature channels are generated. The weights are used for representing importance of the feature channels. A weight calculation method is shown in Formula (2):

$$s = F_{ex}(z, W_1, W_2) = \sigma(w_2 \delta(W_1 Z)) \tag{2}$$

where s represents a weight of C feature channels, whose dimension is 1×1×C; z represents a global information matrix formed by C $z_c$, whose dimension is 1×1×C; $F_{ex}$ represents a weight obtaining function; σ represents a sigmoid function; δ represents a linear activation function; $W_1$ represents a dimensionality reduction layer parameter, whose dimensionality reduction proportion is r, where $$W_1 \in \square^{\frac{C}{r} \times C};$$

and $W_2$ represents a dimensionality increase layer parameter, where $$W_2 \in \square^{C \times \frac{C}{r}}.$$

The squeeze layer 304 compresses the feature map to obtain z. Referring to Formula (2), $W_1$ is first multiplied by z herein, to perform a fully connected layer operation, where the dimension of $W_1$ is (C/r)×C, r is a scaling parameter, and this parameter aims to reduce the quantity of feature channels, thereby reducing the calculation amount. Furthermore, because the dimension of z is 1×1×C, the dimension of $W_1z$ is 1×1×C/r. Then, a linear activation layer is passed through, and the dimension of the output is unchanged. The output of the linear activation layer is then multiplied by $W_2$ to perform a fully connected layer operation, and the dimension of $W_2$ is C×(C/r), so that the dimension of the output is 1×1×C. Finally, the sigmoid function is passed through, to obtain s. The compression processing in the squeeze layer 304 is performed for a feature map of a single feature channel. Therefore, information about the feature maps of the feature channels is fused through two fully connected layers in the excitation layer 306, learning is performed based on a dependence relationship between the feature channels, and weights of the feature channels are obtained, so as to precisely describe importance of the feature maps corresponding to the feature channels, so that an effective feature map has a larger weight, and an ineffective or slightly effective feature map has a smaller weight.

S205. Weight the feature maps of the feature channels according to the weights through weighting layers of the convolution squeeze and excitation networks, respectively, and generate weighted feature maps.

In one implementation, through the weighting layers of the convolution squeeze and excitation networks, the feature maps of the feature channels are respectively multiplied by the corresponding weights, to generate the weighted feature maps. This is shown in Formula (3) as follows:

$$\tilde{x}_c = F_{scale}(u_c, s_c) = s_c \cdot u_c \quad (3)$$

where $\tilde{x}_c$ represents a weighted feature map of a feature channel C; $F_{scale}$ represents a weighting function; and $s_c$ represents a weight of a feature channel C.

Based on the foregoing squeeze and excitation operation, the weighted feature maps are generated and inputted to a next-layer in the network for processing. The weighted feature maps are obtained according to the weights of the feature channels. Therefore, an ineffective or slightly effective feature can be suppressed while enhancing an effective feature, to strengthen the learning capability of the network, so that the glasses-removing model can complete glasses-removing processing by using fewer convolution kernels (only 64 or 128 convolution kernels are used at the convolution layer), thereby reducing the model size and further reducing the model complexity.

S206. Generate a glasses-removed image corresponding to the target image according to the weighted feature maps through the glasses-removing model.

The glasses-removing model is a trained model and has a glasses-removing functionality, and after processing by the plurality of convolution squeeze and excitation networks in the glasses-removing model and other network layers, a glasses-removed image corresponding to the target image is generated according to the weighted feature maps.

According to the image processing method, a target image is obtained, and the target image is inputted to a glasses-removing model that is obtained through pre-training; because the glasses-removing model includes a plurality of sequentially connected convolution squeeze and excitation networks, feature maps of feature channels of the target image may be obtained through convolution layers of the convolution squeeze and excitation networks, then global information of the feature channels is obtained according to the feature maps through squeeze and excitation layers of the convolution squeeze and excitation networks, the global information is learned to generate weights of the feature channels, then the feature maps of the feature channels are weighted respectively according to the weights through weighting layers of the convolution squeeze and excitation networks, weighted feature maps are generated, and finally a corresponding glasses-removed image is obtained according to the weighted feature maps through the glasses-removing model. In this way, the glasses-removing model can keep a relatively high learning capability, and therefore can fully learn importance of different feature channels to obtain corresponding weights, to suppress an ineffective or slightly effective feature through weighting processing while enhancing an effective feature, effectively remove glasses in the target image, and ensure that a key feature of the target image can be restored from the glasses-removed image, thereby improving the restoration degree and authenticity of the glasses-removed image.

Figure 6:
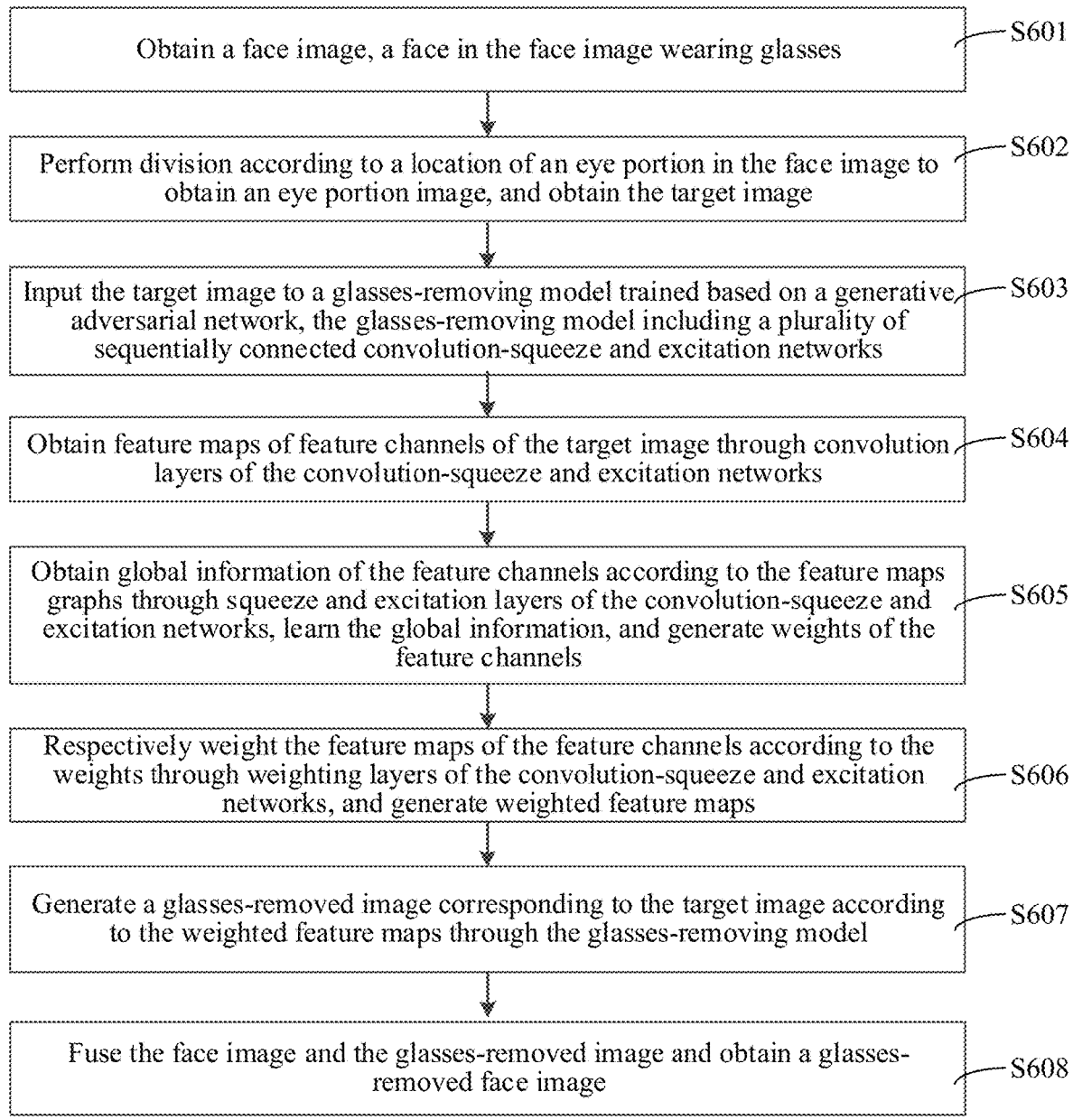
FIG. 6 is a schematic flowchart of an image processing method according to an embodiment.

In an embodiment, an image processing method is provided. In the embodiment, the glasses-removing model is a model obtained by removing glasses from a local eye portion image. As shown in FIG. 6, the method includes the following operations:

S601. Obtain a face image comprising a face wearing glasses.

In this embodiment, the face image refers to a picture including information about an entire face.

S602. Perform division according to a location of an eye portion in the face image to obtain an eye portion image as the target image.

In a possible implementation, target detection is performed on the face image, a location of an eye portion in the face image is determined, division is performed based on the determined location to obtain an eye portion image, and the eye portion image obtained through division is taken as the target image.

S603. Input the target image to a glasses-removing model which is trained based on a generative adversarial network, the glasses-removing model including a plurality of sequentially connected convolution squeeze and excitation networks.

S604. Obtain feature maps of feature channels of the target image through convolution layers of the convolution squeeze and excitation networks.

S605. Obtain global information of the feature channels according to the feature maps through squeeze and excitation layers of the convolution squeeze and excitation networks, learn the global information, and generate weights of the feature channels.

S606. Weight the feature maps of the feature channels according to the weights through weighting layers of the convolution squeeze and excitation networks, respectively, and generate weighted feature maps.

S607. Generate a glasses-removed image corresponding to the target image according to the weighted feature maps through the glasses-removing model.

S608. Fuse the face image and the glasses-removed image and obtain a glasses-removed face image.

In this embodiment, the glasses-removed image applies to the eye. When performing glasses removing, target detection is performed on the face image, a location of an eye portion in the face image is determined, and the glasses-removed image replaces an eye portion image at the determined location, to obtain the glasses-removed face image. The glasses-removing model based on the eye portion image can enhance processing and precision of the model by focusing on the eye portion region, to improve the glasses-removing effect.

In an embodiment, before the operation of inputting the target image to a glasses-removing model which is trained based on a generative adversarial network, the method further includes: performing normalization processing on the target image. After the operation of generating a glasses-removed image corresponding to the target image according to the weighted feature maps through the glasses-removing model, the method further includes: performing restoration processing on the glasses-removed image, to restore the glasses-removed image to the size of the target image. It may be understood that, in this implementation, in the operation of inputting the target image to a glasses-removing model, the target image refers to the target image after the normalization processing.

The normalization processing refers to normalizing the original image into the same size and the same pixel value range. The restoration processing refers to inverse processing opposite to the normalization processing, that is, restoring the image size to the original image size and restoring the pixel value range to the pixel value range of the original image. For example, in the normalization processing, the original image size is normalized to 256*256, and then the image pixel value is normalized to [−1, 1]; and in the restoration processing, assuming that the pixel value range of the original image is [0, 255], the image is restored to the original image size, and the pixel value is normalized to [0, 255].

Figure 7:
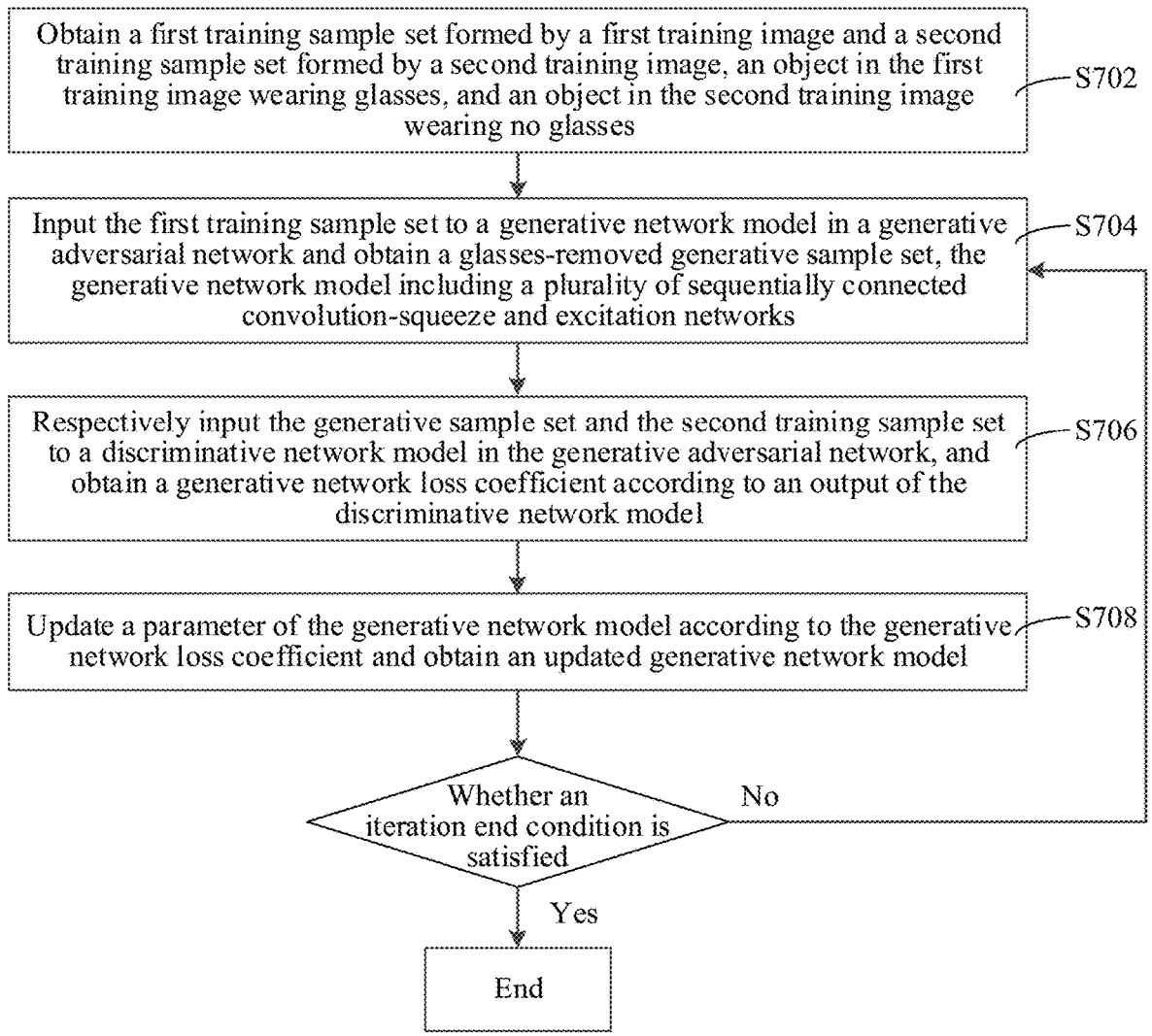
FIG. 7 is a schematic flowchart of a method for training a glasses-removing model according to an embodiment.

In an embodiment, as shown in FIG. 7, a manner of training a glasses-removing model in an image processing method is provided, and includes the following operations:

S702. Obtain a first training sample set formed by a first training image and a second training sample set formed by a second training image, an object in the first training image wearing glasses, and an object in the second training image wearing no glasses.

The first training sample set is formed by a plurality of first training images (first training samples) on which normalization processing is performed, and correspondingly the second training sample set is formed by a plurality of second training images (second training samples) on which normalization processing is performed. The training samples in the first training sample set and the training samples in the second training sample set are in one-to-one correspondence, and are only different in whether wearing glasses or not. The worn glasses are frame glasses. For example, in the normalization processing, the original image size is normalized to 256*256, and then the image pixel value is normalized to [−1, 1].

Furthermore, the second training sample may be the second training image obtained through various means, or obtained by replicating the existing second training image, and the first training sample may be obtained by performing glasses-adding processing on the second training sample; and the first training sample and the second training sample may alternatively be a large quantity of image samples captured by a face image capture device, such as a camera. It may be understood that, when the trained glasses-removing model is a model obtained by removing glasses from a global face image, the training samples are global face images; and when the trained glasses-removing model is a model obtained by removing glasses from a local eye portion image, the training samples are local eye portion images. The model training based on the eye portion image can enhance processing of the model on the eye portion region, to improve the glasses-removing effect.

S704. Input the first training sample set to a generative network model in a generative adversarial network and obtain a glasses-removed generative sample set, the generative network model including a plurality of sequentially connected convolution squeeze and excitation networks.

The generative sample set refers to a set formed by generative samples corresponding to the first training samples. Further, the generative sample refers to a face image generated after the generative network model performs glasses-removing processing on the first training sample.

When the generative sample set is obtained, the first training samples in the first training sample set are sequentially inputted to a generative network model in a generative adversarial network, and feature maps of feature channels of the first training samples are sequentially obtained through convolution layers of convolution squeeze and excitation networks in the generative network model. Global information of the feature channels is obtained according to the feature maps through squeeze and excitation layers of the convolution squeeze and excitation networks, and the global information is learned, weights of the feature channels are generated; and further, the feature maps of the feature channels are weighted respectively according to the weights through weighting layers of the convolution squeeze and excitation networks, and weighted feature maps corresponding to the first training samples are generated. The weighted feature maps corresponding to the first training samples are further processed based on the generative network model to obtain generative samples corresponding to the first training samples, and all of the generative samples form the generative sample set.

S706. Input the generative sample set and the second training sample set to a discriminative network model in the generative adversarial network, respectively, and obtain a generative network loss coefficient according to the output of the discriminative network model.

The loss coefficient refers to a parameter used for evaluating a network model prediction effect, and a smaller loss coefficient usually indicates a better network model prediction effect. Correspondingly, the generative network loss coefficient refers to a parameter used for evaluating a glasses-removing effect of the generative network model, and parameters in the generative network model are adjusted based on the generative network loss coefficient, so as to achieve a better glasses-removing effect. In this embodiment, a corresponding generative network loss coefficient is generated based on each of different generative samples.

As described above, the training of the generative adversarial network means that the generative network model generates a picture to deceive the discriminative network model, and then the discriminative network model determines whether this picture and a corresponding true picture are true or fake. It may be understood that, in this embodiment, the training of the generative adversarial network aims to enable the generative sample image generated by the generative network model to be as closely undistinguishable with the true image. In other words, to make it difficult for the discriminative network model to distinguish whether the generative sample is a generative image or a true image.

When the generative adversarial network is trained, the generative sample set and the second training sample set are respectively inputted to the discriminative network model in the generative adversarial network, and a parameter of the discriminative network model is adjusted according to an output of the discriminative network model, to obtain an updated discriminative network model; and then the generative sample set is inputted to the updated discriminative network model and the generative network loss coefficient is obtained according to an output of the updated discriminative network model, so as to adjust a parameter of the generative network model according to the generative network loss coefficient. The parameter of the generative network model refers to a weight of a connection between neurons in the generative network model.

S708. Update a parameter of the generative network model according to the generative network loss coefficient, obtain an updated generative network model, and return to operation S704; and take the updated generative network model as the glasses-removing model if an iteration end condition is satisfied.

In this embodiment, the parameter of the generative network model is adjusted according to the generative network loss coefficient and a predetermined parameter adjustment method for the generative network model, to obtain the updated generative network model. At the end of each iteration, the preset iteration end condition checked. If the iteration end condition is satisfied, the training iteration is ended, and the updated generative network model is taken as the glasses-removing model; otherwise, the process returns to operation S704 to repeat the training iteration until the preset iteration end condition is satisfied.

The parameter adjustment method for the generative network model includes, but is not limited to, error correction algorithms such as a gradient descent algorithm and a back propagation algorithm, for example, the adaptive moment estimation (Adam) algorithm for optimizing a stochastic objective function based on a first-order gradient. The iteration end condition may be that the iteration count reaches an iteration count threshold or may be that the generative network model achieves the preset glasses-removing effect, and is not limited herein.

Through the foregoing training manner of the glasses-removing model, the generative network model including a plurality of sequentially connected convolution squeeze and excitation networks and one discriminative network model are combined to form the generative adversarial network, and generative adversarial training is performed, so that the generative network model is obtained and used as the glasses-removing model which may be used to effectively remove glasses. Moreover, based on the convolution squeeze and excitation networks, the global information of the feature channels corresponding to the inputted training samples is learned, the weights of the feature channels are generated, and the feature maps of the feature channels are weighted according to the weights respectively, to generate the corresponding weighted feature maps, thereby suppressing an ineffective or slightly effective feature through weighting processing while enhancing an effective feature, thus effectively removing glasses in the first training samples in the first training sample set, and restoring key features corresponding to the first training samples from the generative samples, to improve the restoration degree and authenticity of the generative samples.

Figure 8:
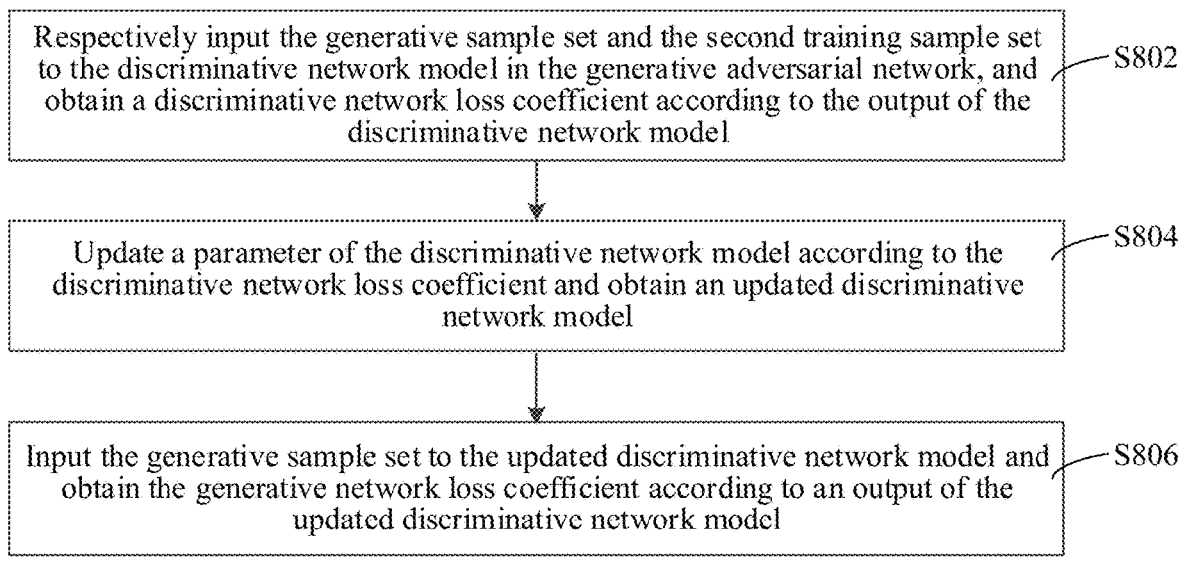
FIG. 8 is a schematic flowchart of operations of generating a generative network loss coefficient according to an embodiment.

In an embodiment, as shown in FIG. 8, the operation of inputting the generative sample set and the second training sample set to a discriminative network model in the generative adversarial network respectively and obtaining a generative network loss coefficient according to an output of the discriminative network model includes the following operations:

S802. Input the generative sample set and the second training sample set to the discriminative network model in the generative adversarial network, respectively, and obtain a discriminative network loss coefficient according to the output of the discriminative network model.

The discriminative network loss coefficient refers to a parameter used for evaluating a classification effect of the discriminative network model, and parameters in the discriminative network model are adjusted based on the discriminative network loss coefficient, so as to implement more accurate classification. In this embodiment, a corresponding discriminative network loss coefficient is generated based on each of different generative samples.

When the discriminative network loss coefficient is obtained, the generative samples in the generative sample set and the second training samples in the second training sample set are sequentially inputted to the discriminative network model in the generative adversarial network, to obtain outputs corresponding to the generative samples and the second training samples respectively, and discriminative network loss coefficients are obtained according to the outputs of the generative samples and the second training samples corresponding to the generative samples, where the quantity of the discriminative network loss coefficients is the same as the quantity of the generative samples.

S804. Update a parameter of the discriminative network model according to the discriminative network loss coefficient and obtain an updated discriminative network model.

The parameter of the discriminative network model refers to a weight of a connection between neurons in the discriminative network model. In this embodiment, the parameter of the discriminative network model is adjusted according to the discriminative network loss coefficient and a predetermined parameter adjustment method for the discriminative network model, to obtain the updated discriminative network model. The parameter adjustment method for the discriminative network model includes, but is not limited to, error correction algorithms such as a gradient descent algorithm and a back propagation algorithm, for example, the Adam algorithm for optimizing a stochastic objective function based on a first-order gradient.

S806. Input the generative sample set to the updated discriminative network model and obtain the generative network loss coefficient according to an output of the updated discriminative network model.

The current discriminative network model after the update has a better classification effect compared with the discriminative network model before the update. Therefore, in the next iteration, use the updated discriminative network model with updated parameter, and train the generative network model.

When the generative network model is trained, the generative samples in the generative sample set are sequentially inputted to the updated discriminative network model, each generative sample corresponds to one output of the updated discriminative network model, and a generative network loss coefficient is obtained according to the output of the updated discriminative network model.

In this embodiment, the parameter of the generative network model is first fixed, and the discriminative network model is trained and updated, so that the trained discriminative network model maintains a classification capability. After the discriminative network model is trained, the generative network model is trained and updated. In this case, the parameter of the discriminative network model is fixed, and only a loss or an error generated by the generative network model is transferred to the generative network model, that is, the generative network loss coefficient is obtained according to the output of the updated discriminative network model, and the parameter of the generative network model is updated based on the generative network loss coefficient. Through a rivalry game between the discriminative network model and the generative network model, the two network models finally reach a steady state.

In an embodiment, the operation of inputting the generative sample set and the second training sample set to the discriminative network model respectively and obtaining a discriminative network loss coefficient according to the output of the discriminative network model includes: inputting the generative sample set and the second training sample set to the discriminative network model respectively and obtaining a first probability corresponding to the generative sample set and a second probability corresponding to the second training sample set; and obtaining the discriminative network loss coefficient according to the first probability, the second probability, and a discriminative network loss function.

The first probability refers to a probability that a generative sample is determined by the discriminative network model to be a training sample and not a generative sample, and the second probability refers to a probability that a second training sample is determined by the discriminative network model to be a training sample and not a generative sample. Assuming that a category identifier of the generative sample is set to 0 and a category identifier of the second training sample is set to 1, the first probability and the second probability range from 0 to 1. The training of the discriminative network model aims to enable the first probability corresponding to the generative sample to approximate to 0 as close as possible and enable the second probability corresponding to the second training sample to approximate to 1 as close as possible, thereby obtaining an accurate classification capability.

The discriminative network loss function refers to a function for calculating a loss coefficient of the discriminative network model according to the output of the discriminative network model. For example, the discriminative network loss function may be a cross entropy loss function, or a function $$\max_{D} V(D, G)$$

of maximizing a discriminative network discrimination degree shown in Formula (4).

$$\max_{D} V(D, G) = E_{x \sim p_{data}(x)}[\log D(x)] + E_{x \sim p_y(y)}[\log(1 - D(G(y)))] \quad (4)$$

where D represents the discriminative network model, G represents the generative network model, x represents any second training sample, $P_{data}(x)$ represents a category identifier of a second training sample, D (x) represents a probability corresponding to any second training sample which is referred to as the second probability in this embodiment, Y represents any first training sample, $p_y(y)$ represents a category identifier of a generative sample, G(y) represents a generative sample corresponding to any first training sample, and D (G (y)) represents a probability corresponding to any generative sample which is referred to as the first probability in this embodiment.

When the discriminative network loss coefficient is obtained, generative samples in the generative sample set and the category identifier thereof, and the second training samples in the second training sample set and the category identifier thereof are sequentially inputted to the discriminative network model, to obtain the first probability corresponding to the generative sample set and the second probability corresponding to the second training sample set; and the discriminative network loss coefficient is obtained according to the first probability, the second probability, and a discriminative network loss function.

In an embodiment, the operation of inputting the generative sample set to the updated discriminative network model and obtaining the generative network loss coefficient according to an output of the updated discriminative network model includes: inputting the generative sample set to the updated discriminative network model and obtaining a third probability corresponding to the generative sample set; and obtaining the generative network loss coefficient according to the third probability and a generative network loss function.

The third probability refers to a probability that a generative sample is determined by the discriminative network model to be a training sample and not generative sample. The generative network loss function refers to a function for calculating a loss coefficient of the generative network model according to the output of the generative network model. For example, the generative network loss function may be a cross entropy loss function, or a function $$\min_{G} V(D, G)$$

of minimizing data distribution of generative samples and training samples shown in Formula (5).

$$\min_{G} V(D, G) = E_{y \sim p_y(y)}[\log(1 - D(G(y)))] \quad (5)$$

where D(G(y)) represents a probability corresponding to any generative sample, which is referred to as the third probability in this embodiment.

After the generative network loss coefficient is obtained, the generative samples in the generative sample set and the category identifier thereof are sequentially inputted to the discriminative network model, to obtain the third probability corresponding to the generative sample set; and the generative network loss coefficient is obtained according to the third probability and a generative network loss function.

Opposite to the training of the discriminative network model, in this embodiment, the category identifier of the generative sample is set to 1, so as to deceive a discriminator, thereby enabling the generative sample to gradually approximate to the true second training sample.

Figure 9:
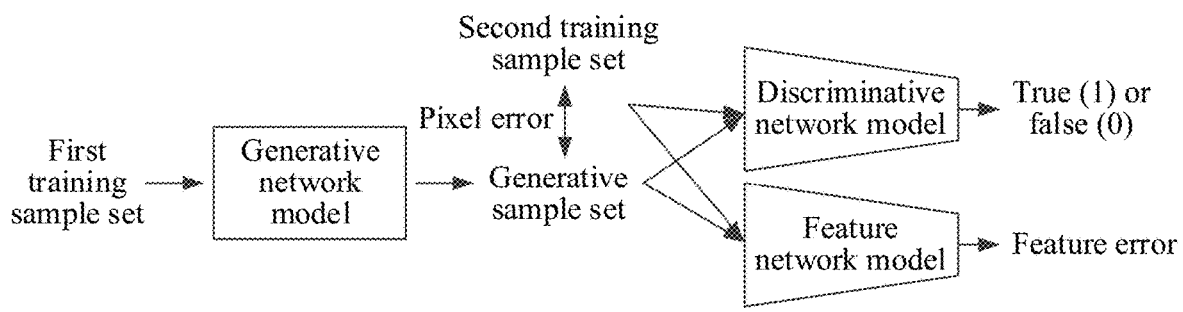
FIG. 9 is a schematic structural diagram of a network model in a method for training a glasses-removing model according to an embodiment.

In an embodiment, as shown in FIG. 9, the manner of training the glasses-removing model further includes a feature network model. Furthermore, before updating a parameter of the generative network model according to the generative network loss coefficient and obtaining an updated generative network model, the method further includes: inputting the generative sample set and the second training sample set to a feature network model respectively and obtaining a feature error between the generative sample set and the second training sample set; and updating a parameter of the generative network model according to the generative network loss coefficient and obtaining an updated generative network model includes: updating a parameter of the generative network model according to the generative network loss coefficient and the feature error to obtain an updated generative network model.

The feature error refers to a difference between the generative sample and its corresponding second training sample in a feature space. It may be understood that, the feature error between the generative sample set and the second training sample set refers to a difference in the feature space between the generative samples in the generative sample set and the corresponding second training samples.

When the generative network model is updated based on the feature network model, the generative samples in the generative sample set and the corresponding second training samples are sequentially inputted to the feature network model, and the feature network model extracts features of the generative samples and the corresponding second training samples, and performs comparison and analysis, to obtain the feature error between the generative samples and the corresponding second training samples. The parameter of the generative network model is adjusted according to the generative network loss coefficient, the feature error, and a predetermined parameter adjustment method for the generative network model, to obtain the updated generative network model. For example, the parameter of the generative network model is adjusted according to the generative network loss coefficient and the feature error by using the Adam algorithm, to obtain an updated generative network model.

By analyzing the feature error between the generative samples in the generative sample set and the corresponding second training samples, the finally obtained glasses-removed image generated by the glasses-removing model further keeps discrimination information, thereby restoring the key feature of the target image more accurately, improving the restoration degree of the glasses-removed image, and ensuring the accuracy of facial recognition in a facial recognition application.

In another embodiment, before updating a parameter of the generative network model according to the generative network loss coefficient and obtaining an updated generative network model, the method further includes: analyzing pixels of the generative sample set and pixels of the second training sample set and obtaining a pixel error between the generative sample set and the second training sample set; and updating a parameter of the generative network model according to the generative network loss coefficient to obtain an updated generative network model includes: updating a parameter of the generative network model according to the generative network loss coefficient and the pixel error and obtaining an updated generative network model.

The pixel error refers to a pixel points difference between the generative sample and the corresponding second training sample. It may be understood that, the pixel error between the generative sample set and the second training sample set refers to a pixel points difference between the generative samples in the generative sample set and the corresponding second training samples.

When the generative network model is updated, error analysis is sequentially performed on the pixel points of the generative samples in the generative sample set and the second training samples corresponding to the generative samples, to obtain the pixel error between the generative samples in the generative sample set and the second training samples corresponding to the generative samples. The parameter of the generative network model is adjusted according to the generative network loss coefficient, the pixel error, and a predetermined parameter adjustment method for the generative network model, to obtain the updated generative network model. For example, the parameter of the generative network model is adjusted according to the generative network loss coefficient and the pixel error by using the Adam algorithm, to obtain an updated generative network model.

In an embodiment, before updating a parameter of the generative network model according to the generative network loss coefficient and obtaining an updated generative network model, the method further includes: analyzing pixels of the generative sample set and pixels of the second training sample set and obtaining a pixel error between the generative sample set and the second training sample set; and inputting the generative sample set and the second training sample set to a feature network model respectively to obtain a feature error between the generative sample set and the second training sample set; and updating a parameter of the generative network model according to the generative network loss coefficient to obtain an updated generative network model includes: updating a parameter of the generative network model according to the generative network loss coefficient, the pixel error, and the feature error to obtain an updated generative network model.

By analyzing the feature error and the pixel error between the generative samples in the generative sample set and the second training samples corresponding to the generative samples, the restoration degree of the finally obtained glasses-removed image generated by the glasses-removing model is high.

Figure 10:
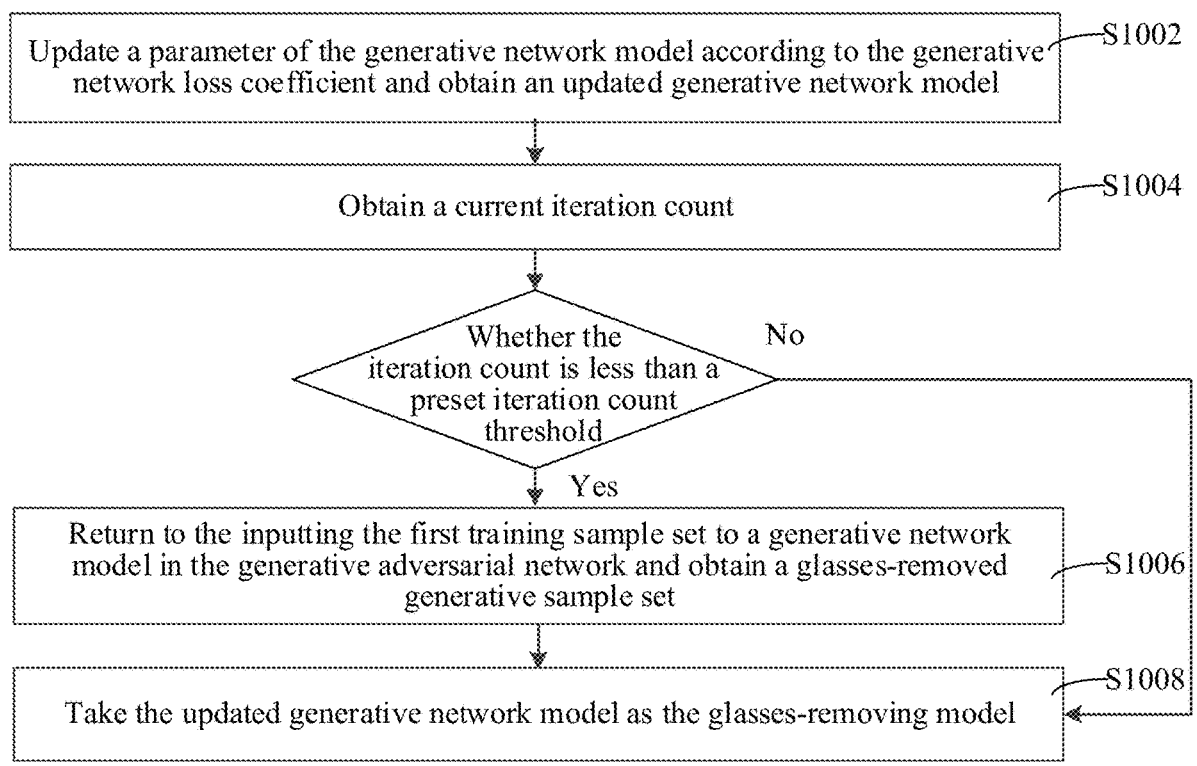
FIG. 10 is a schematic flowchart of operations of updating a generative network model and performing iteration according to an embodiment.

In an embodiment, as shown in FIG. 10, operation S708 further includes the following operations:

S1002. Update a parameter of the generative network model according to the generative network loss coefficient and obtain an updated generative network model.

S1004. Obtain a current iteration count.

S1006. Return, if the iteration count is less than a preset iteration count threshold, to the iteration (inputting the first training sample set to a generative network model in the generative adversarial network and obtain a glasses-removed generative sample set).

S1008. Use the updated generative network model as the glasses-removing model if the iteration count reaches the preset iteration count threshold.

In this embodiment, each time the training of the generative adversarial network is completed, the iteration count is incremented by one to obtain the current iteration count, and whether the current iteration count reaches the iteration count threshold is determined; if the threshold is not reached, training related operations continue to be performed, that is, the iteration is repeated; otherwise, the updated generative network model is taken as the glasses-removing model, and the training operation is ended.

In an embodiment, after operation S708, the method further includes an operation of testing the glasses-removing model, and the operation includes: obtaining a test sample set formed by test images, an object in each of the test images wearing glasses; and inputting the test sample set to the glasses-removing model which is obtained through training, and obtaining a test result according to an output of the glasses-removing model. The test sample set is formed by a plurality of test images (test samples) processed by normalization, and the test image and the first training image are different images. The performance of the glasses-removing model obtained through training is further tested, so as to determine whether the currently obtained glasses-removing model satisfies the preset glasses-removing effect.

Figure 11:
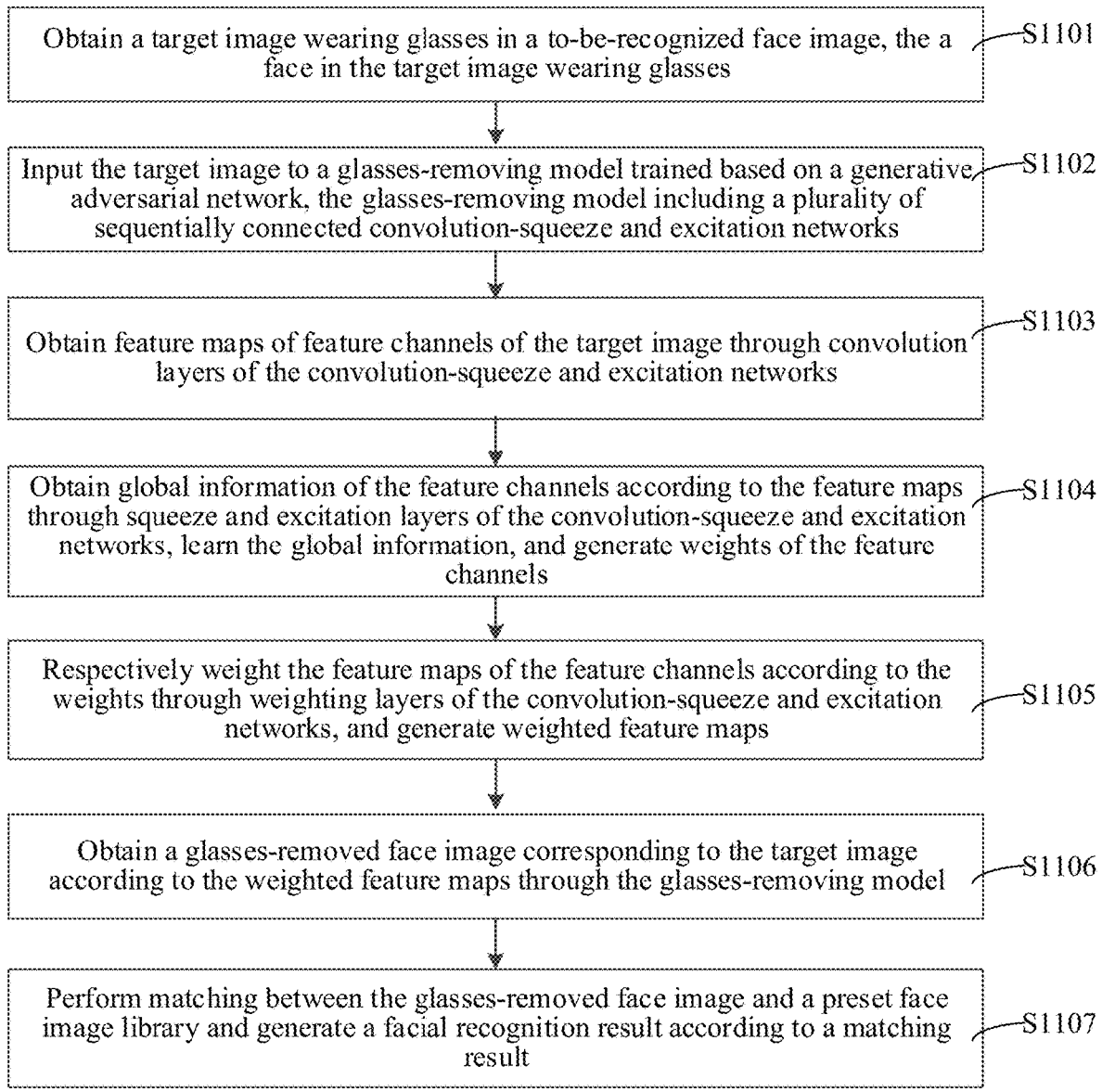
FIG. 11 is a schematic flowchart of a facial recognition method according to an embodiment.

In an embodiment, a method for performing facial recognition by using a glasses-removing model is provided. As shown in FIG. 11, the method includes the following operations:

S1101. Obtain a target image in a to-be-recognized face image, a face in the target image wearing glasses.

The to-be-recognized face image refers to a face image that needs to be recognized, for example, a global face image captured by an image capture device for identity verification during security check. The to-be-recognized face image may be a face image of a face wearing glasses, or may be a face image of a face wearing no glasses. The target image refers to an image that carries glasses wearing information which is identified by analysis on the to-be-recognized face image, and on which glasses-removing processing needs to be performed. That is, the face in the target image wears glasses, and glasses-removing processing needs to be performed on the face. The target image may be a face image of a face wearing glasses, or may be an eye portion image obtained by dividing a face image of a face wearing glasses. For example, when the glasses-removing model is trained and obtained by removing glasses from a global face image, the target image is a global face image; and when the glasses-removing model is trained and obtained by removing glasses from a local eye portion image, the target image is a local eye portion image.

In this embodiment, a target image may be obtained by glasses recognition and detection on the to-be-recognized face image, or the target image may be predetermined. The target image is the input to the glasses-removing model for glasses-removing processing.

S1102. Input the target image to a glasses-removing model which is trained based on a generative adversarial network, the glasses-removing model including a plurality of sequentially connected convolution squeeze and excitation networks.

S1103. Obtain feature maps of feature channels of the target image through convolution layers of the convolution squeeze and excitation networks.

In a possible implementation, convolution processing is performed on the inputted target image through convolution layers of the convolution squeeze and excitation networks, feature maps of feature channels of the target image are obtained, and the feature maps are inputted to squeeze and excitation layers of the convolution squeeze and excitation networks.

S1104. Obtain global information of the feature channels according to the feature maps through squeeze and excitation layers of the convolution squeeze and excitation networks, learn the global information, and generate weights of the feature channels.

In a possible implementation, the feature maps are compressed in the squeeze layer to obtain the global information of the feature channels, and the global information is learned in the excitation layer to generate weights of the feature channels.

S1105. Weight the feature maps of the feature channels according to the weights through weighting layers of the convolution squeeze and excitation networks, respectively, and generate weighted feature maps.

In a possible implementation, through the weighting layers of the convolution squeeze and excitation networks, the feature maps of the feature channels are multiplied by the corresponding weights respectively, and the weighted feature maps are generated.

S1106. Obtain a glasses-removed face image corresponding to the target image according to the weighted feature maps through the glasses-removing model.

The glasses-removed face image refers to a global face image that corresponds to the target image and that is obtained after glasses are removed. When the target image is a global face image, the glasses-removed face image refers to an image obtained after glasses are removed from the target image; and when the target image is a local eye portion image, the glasses-removed face image refers to a face image obtained by fusing the glasses-removed target image and the to-be-recognized face image corresponding to the target image.

S1107. Perform matching between the glasses-removed face image and a preset face image library and generate a facial recognition result according to a matching result.

The preset face image library stores registered or verified face images. The facial recognition result includes one or more types of data of recognition success, recognition failure and related information about a matched face image, the result data type may be set according to a recognition requirement, and is not limited herein. For example, in a security verification system for public transportation or a face access control system, the facial recognition result may be recognition success or recognition failure. When information query is performed in a public security verification system, the facial recognition result further includes related information about a matched face image.

In this embodiment, matching is performed between the glasses-removed face image and images in the preset face image library through the conventional facial recognition model, to obtain a matching result, and the facial recognition result is generated according to the matching result. For example, when a face image in the preset face image library is identified through matching, the facial recognition result of recognition success is generated; or, related information about the matched face image is further obtained, and the facial recognition result is generated according to the related information. When no face image in the preset face image library is identified through matching, the facial recognition result of recognition failure is generated. The conventional facial recognition model includes, but is not limited to, the Bruce-Young model, the interactive activation and competition model, and the like.

The glasses in the to-be-recognized face image are removed through the glasses-removing model without the need of manually taking off the glasses before performing face image capture and facial recognition, thereby improving facial recognition efficiency and solving the problem that recognition cannot be performed due to interference from the glasses. Moreover, the glasses-removing model formed by a plurality of convolution squeeze and excitation networks can enhance the effective features of the target image, suppress the ineffective or slightly effective features, effectively remove glasses in the target image, and ensure that the glasses-removed image can restore the key feature of the target image, thereby improving the restoration degree and authenticity of the glasses-removed image and further ensuring the accuracy of the facial recognition result.

Figure 12:
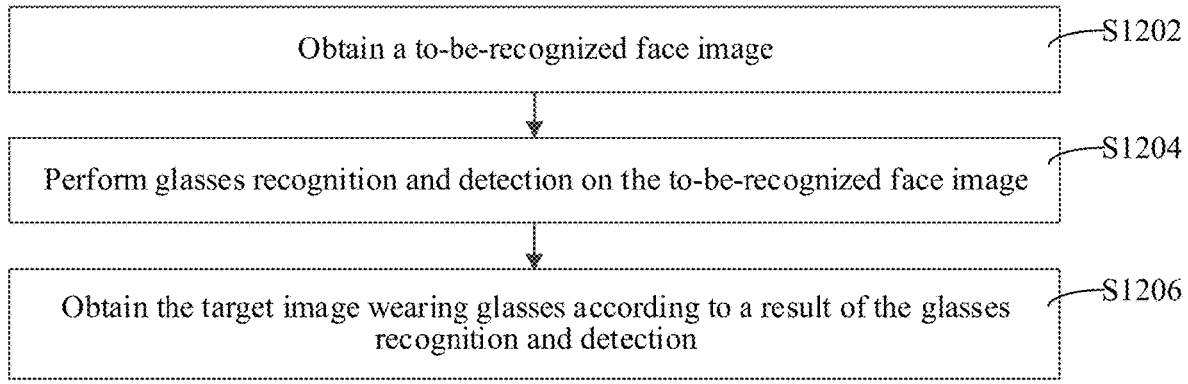
FIG. 12 is a schematic flowchart of operations of obtaining a target image through glasses recognition and detection according to an embodiment.

In an embodiment, as shown in FIG. 12, the operation of obtaining a target image in a to-be-recognized face image includes the following operations:

S1202. Obtain a to-be-recognized face image.

S1204. Perform glasses recognition and detection on the to-be-recognized face image.

S1206. Obtain the target image according to a result of the glasses recognition and detection.

During facial recognition, glasses recognition and detection is first performed on the to-be-recognized face image, and whether a face in the to-be-recognized face image wears glasses is determined; if the face wears the glasses, the target image is obtained and inputted to the glasses-removing model for glasses-removing processing, and then inputted to the facial recognition model for recognition; if the face in the to-be-recognized face image wears no glasses, the target image is directly inputted to the facial recognition model for recognition. The glasses recognition and detection may be performed through a conventional target detection model such as a target detection model based on deep learning or a region-based convolutional neural network.

In an embodiment, obtaining the target image wearing glasses according to a result of the glasses recognition and detection includes: performing, in response to detecting that a face in the to-be-recognized face image wears glasses, division according to a location of an eye portion in the to-be-recognized face image to obtain an eye portion image as the target image; and obtaining a glasses-removed face image corresponding to the target image according to the weighted feature maps through the glasses-removing model includes: generating a glasses-removed image corresponding to the target image according to the weighted feature maps through the glasses-removing model; and fusing the to-be-recognized face image and the corresponding glasses-removed image to obtain the glasses-removed face image.

In this embodiment, when it is detected that the face in the to-be-recognized face image wears glasses, target detection is performed on the face image, a location of an eye portion in the face image is determined, division is performed based on the determined location to obtain an eye portion image, and the eye portion image obtained through division is taken as the target image, so as to perform glasses-removing processing on the target image. The glasses-removed image corresponding to the target image is generated through the glasses-removing model, and the glasses-removed image replaces the eye portion image at the determined location according to the determined location of the eye portion in the face image, to obtain the glasses-removed face image.

In an embodiment, before the operation of inputting the target image to a glasses-removing model which is trained based on a generative adversarial network, the method further includes: performing normalization processing on the target image. The operation of obtaining a glasses-removed face image corresponding to the target image according to the weighted feature maps through the glasses-removing model includes: generating a glasses-removed image corresponding to the target image according to the weighted feature maps through the glasses-removing model; and performing restoration processing on the glasses-removed image, restoring the glasses-removed image to the size of the target image, and obtaining the glasses-removed face image corresponding to the target image. It may be understood that, in this implementation, the input target image to a glasses-removing model refers to the target image after the normalization processing.

Figure 13:
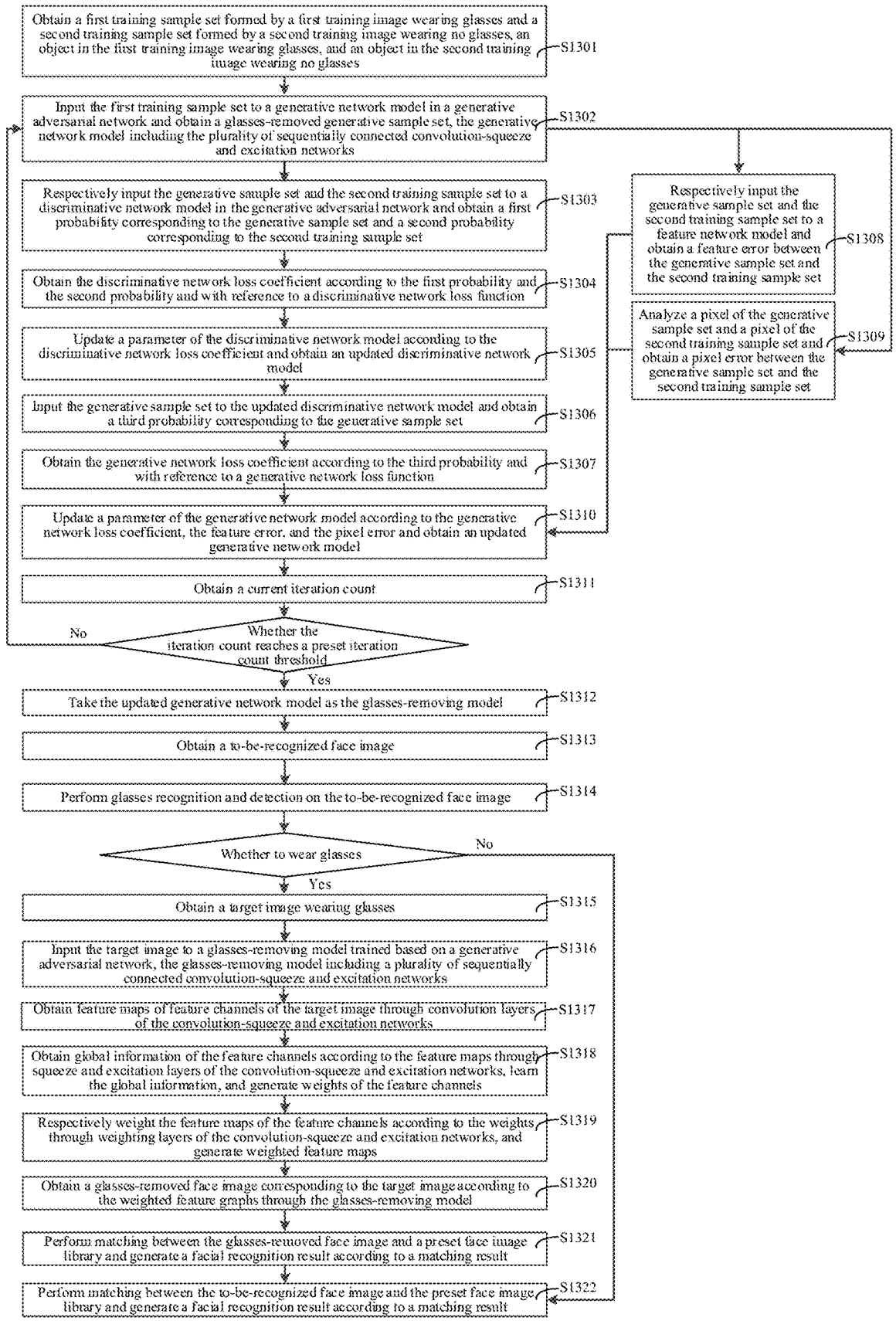
FIG. 13 is a schematic flowchart of a facial recognition method according to an embodiment.

A facial recognition method in a complete embodiment is provided below by using an example in which a target image is a global face image, and the method includes an operation of training a glasses-removing model. As shown in FIG. 13, the method includes the following operations:

S1301. Obtain a first training sample set formed by a first training image and a second training sample set formed by a second training image, an object in the first training image wearing glasses, and an object in the second training image wearing no glasses.

In this embodiment, each of the first training samples in the first training sample set and each of the second training samples in the second training sample set are global face images. The second training sample may be the second training image obtained through various image obtaining means, or by replicating existing second training image, and each of the first training samples may be obtained by performing glasses-adding processing on a second training sample; and the first training sample and the second training sample may alternatively be a large quantity of image samples captured by a face image capture device such as a camera.

S1302. Input the first training sample set to a generative network model in a generative adversarial network and obtain a glasses-removed generative sample set, the generative network model including a plurality of sequentially connected convolution squeeze and excitation networks.

When the generative sample set is obtained, the first training samples in the first training sample set are sequentially inputted to a generative network model in a generative adversarial network, feature maps of feature channels of the first training samples are sequentially obtained through convolution layers of convolution squeeze and excitation networks in the generative network model, and the feature maps are inputted to squeeze and excitation layers of the convolution squeeze and excitation networks. Global information of the feature channels is obtained according to the feature maps through the squeeze and excitation layer, and the global information is learned, weights of the feature channels are generated; and further, the feature maps of the feature channels are weighted respectively according to the weights through weighting layers of the convolution squeeze and excitation networks, and weighted feature maps corresponding to the first training samples are generated. The weighted feature maps corresponding to the first training samples are further processed based on the generative network model, generative samples corresponding to the first training samples are finally generated, and all of the generative samples form the generative sample set.

S1303. Respectively input the generative sample set and the second training sample set to a discriminative network model in the generative adversarial network and obtain a first probability corresponding to the generative sample set and a second probability corresponding to the second training sample set.

In this embodiment, generative samples in the generative sample set and the category identifier thereof, and the second training samples in the second training sample set and the category identifier thereof are sequentially inputted to the discriminative network model, to obtain the first probability corresponding to the generative sample set and the second probability corresponding to the second training sample set.

S1304. Obtain the discriminative network loss coefficient according to the first probability, the second probability, and a discriminative network loss function.

S1305. Update a parameter of the discriminative network model according to the discriminative network loss coefficient and obtain an updated discriminative network model.

In this embodiment, the discriminative network loss coefficient is calculated by using the function $$\max_D V(D, G)$$

of maximizing a discriminative network discrimination degree shown in Formula (4), and the parameter of the discriminative network model is updated by using the Adam algorithm, so that the first probability outputted by the updated discriminative network model approximates to 0 as close as possible, and the second probability approximates to 1 as close as possible, to obtain an accurate classification capability.

S1306. Input the generative sample set to the updated discriminative network model and obtain a third probability corresponding to the generative sample set.

S1307. Obtain the generative network loss coefficient according to the third probability and a generative network loss function.

In this embodiment, the generative samples in the generative sample set and the category identifier thereof are sequentially inputted to the discriminative network model, to obtain the third probability corresponding to the generative sample set. The generative network loss coefficient is calculated by using the function $$\min_G V(D, G)$$

of minimizing data distribution of generative samples and training samples shown in Formula (5).

S1308. Respectively input the generative sample set and the second training sample set to a feature network model and obtain a feature error between the generative sample set and the second training sample set.

The generative samples in the generative sample set and the second training samples corresponding to the generative samples are sequentially inputted to the feature network model, and the feature network model extracts features of the generative samples and the corresponding second training samples, and performs comparison and analysis, to obtain the feature error between the generative samples in the generative sample set and the second training samples corresponding to the generative samples.

S1309. Analyze pixels of the generative sample set and pixels of the second training sample set and obtain a pixel error between the generative sample set and the second training sample set.

Error analysis is sequentially performed on the pixel points of the generative samples in the generative sample set and the second training samples corresponding to the generative samples, to obtain the pixel error between the generative samples in the generative sample set and the second training samples corresponding to the generative samples.

S1310. Update a parameter of the generative network model according to the generative network loss coefficient, the feature error, and the pixel error and obtain an updated generative network model.

In this embodiment, the parameter of the generative network model is adjusted and updated according to the generative network loss coefficient, the feature error, and the pixel error by using the Adam algorithm, to obtain an updated generative network model.

S1311. Obtain a current iteration count.

S1312. Take the updated generative network model as the glasses-removing model if the iteration count reaches the preset iteration count threshold; otherwise, return to S1302.

In this embodiment, at the end of each iteration of training the generative adversarial network, the iteration count is incremented by one to obtain the current iteration count, and whether the current iteration count reaches the iteration count threshold is determined; if the current iteration count does not reach the iteration count threshold, training related operations continue to be performed, that is, the iteration is repeated; otherwise, the updated generative network model is taken as the glasses-removing model, and the training operation is ended.

S1313. Obtain a to-be-recognized face image.

S1314. Perform glasses recognition and detection on the to-be-recognized face image.

S1315. Obtain a target image if it is detected that a face in the to-be-recognized face image wears glasses; otherwise, directly perform operation S1322.

In this embodiment, glasses recognition and detection is first performed on the to-be-recognized face image, and whether a face in the to-be-recognized face image wears glasses is determined; and when the face wears the glasses, the target image is obtained and inputted to the glasses-removing model for glasses-removing processing, and then inputted to the facial recognition model for recognition; and if the face in the to-be-recognized face image wears no glasses, the to-be-recognized image is taken as the target image and is directly inputted to the facial recognition model for recognition.

S1316. Input the target image to a glasses-removing model which is trained based on a generative adversarial network, the glasses-removing model including a plurality of sequentially connected convolution squeeze and excitation networks.

S1317. Obtain feature maps of feature channels of the target image through convolution layers of the convolution squeeze and excitation networks.

S1318. Obtain global information of the feature channels according to the feature maps through squeeze and excitation layers of the convolution squeeze and excitation networks, learn the global information, and generate weights of the feature channels.

S1319. Weight the feature maps of the feature channels according to the weights through weighting layers of the convolution squeeze and excitation networks, respectively, and generate weighted feature maps.

In a possible implementation, convolution processing is performed on the inputted target image through convolution layers of the convolution squeeze and excitation networks, and feature maps of feature channels of the target image are obtained; the feature maps are compressed through the squeeze layer in the squeeze and excitation layer, to obtain the global information of the feature channels; the global information is learned through the excitation layer in the squeeze and excitation layer, to generate weights of the feature channels; and through the weighting layer, the feature maps of the feature channels are respectively multiplied by the corresponding weights, to generate weighted feature maps, and the weighted feature maps continue to be inputted to a next-layer network for processing.

S1320. Obtain a glasses-removed face image corresponding to the target image according to the weighted feature maps through the glasses-removing model.

After processing in the plurality of convolution squeeze and excitation networks in the glasses-removing model and other network layers, a glasses-removed face image corresponding to the target image is generated according to the weighted feature maps.

S1321. Perform matching between the glasses-removed face image and a predetermined face image library and generate a facial recognition result according to a matching result. It is to be understood that the step S1322 below handles the target image which does not need glasses-removing processing and belongs to another logic branch, so after S1321 is done, S1322 will be skipped.

S1322. Perform matching between the to-be-recognized face image and the preset face image library and generate a facial recognition result according to a matching result.

In this embodiment, matching is performed between the glasses-removed face image or the to-be-recognized face image and the preset face image library through the conventional facial recognition model, to obtain a matching result, and the facial recognition result is generated according to the matching result. For example, when a face image in the preset face image library is identified through matching, the recognition success result is generated; additionally, related information about the matched face image may be further obtained, and the facial recognition result is generated according to the related information. When no face image in the preset face image library is identified through matching, the recognition failure result is generated.

The glasses in the to-be-recognized face image are removed through the glasses-removing model without manually taking off the glasses and then performing face image capture and facial recognition, thereby improving facial recognition efficiency and avoiding the problem that recognition cannot be performed due to interference from the glasses. Moreover, the glasses-removing model formed by a plurality of convolution squeeze and excitation networks can enhance the effective feature of the target image, suppress the ineffective or slightly effective feature, effectively remove glasses in the target image, and ensure that the glasses-removed image can restore the key feature of the target image, thereby improving the restoration degree and authenticity of the glasses-removed image and further ensuring the accuracy of the facial recognition result.

FIG. 13 is a schematic flowchart of a facial recognition method according to an embodiment. It is to be understood that although the steps in the flowchart in FIG. 13 are sequentially shown according to indication of an arrow, the steps are not necessarily sequentially performed according to a sequence indicated by the arrow. Unless explicitly specified in this application, execution of the steps is not strictly limited, and the steps may be performed in other sequences. Furthermore, at least some steps in FIG. 13 may include a plurality of sub-steps or a plurality of stages. The sub-steps or stages are not necessarily performed at the same moment, and may be performed at different moments. The sub-steps or stages are not necessarily performed in order, and may be performed in turn or alternately with other steps or at least some of sub-steps or stages of other steps.

Figure 14:
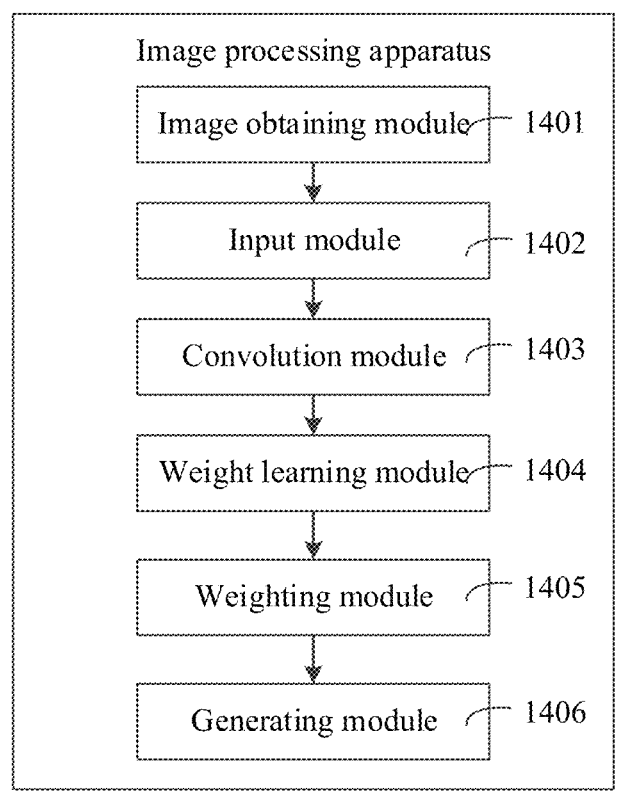
FIG. 14 is a structural block diagram of an image processing apparatus according to an embodiment.

In an embodiment, as shown in FIG. 14, an image processing apparatus is provided, including: an image obtaining module 1401, an input module 1402, a convolution module 1403, a weight learning module 1404, a weighting module 1405, and a generating module 1406.

The image obtaining module 1401 is configured to obtain a target image comprising an object wearing glasses.

The target image refers to an image that carries glasses wearing information and on which glasses-removing processing needs to be performed. That is, the object in the target image wears glasses, and glasses-removing processing needs to be performed on the object. When the object is a face, the target image may be a face image of the face wearing glasses; and when the object is an eye portion, the target image may be an eye portion image obtained by dividing a face image of the face wearing glasses.

The input module 1402 is configured to input the target image to a glasses-removing model which is trained based on a generative adversarial network, the glasses-removing model including a plurality of sequentially connected convolution squeeze and excitation networks.

The convolution module 1403 is configured to obtain feature maps of feature channels of the target image through convolution layers of the convolution squeeze and excitation networks.

In a possible implementation, the convolution module 1403 is configured to perform convolution processing on the inputted target image through convolution layers of the convolution squeeze and excitation networks, obtain feature maps of feature channels of the target image, and input the feature maps to squeeze and excitation layers of the convolution squeeze and excitation networks.

The weight learning module 1404 is configured to obtain global information of the feature channels according to the feature maps through squeeze and excitation layers of the convolution squeeze and excitation networks, learn the global information, and generate weights of the feature channels. In a possible implementation, the feature maps are compressed through the squeeze layer in the squeeze and excitation layer, to obtain the global information of the feature channels; and the global information is learned through the excitation layer in the squeeze and excitation layer, to generate weights of the feature channels.

The weighting module 1405 is configured to respectively weight the feature maps of the feature channels according to the weights through weighting layers of the convolution squeeze and excitation networks, and generate weighted feature maps. The weighting module 1405 multiplies the feature maps of the feature channels by the corresponding weights respectively by using the weighting layer, to generate weighted feature maps, and the weighted feature maps continue to be inputted to a next-layer network for processing.

The generating module 1406 is configured to generate a glasses-removed image corresponding to the target image according to the weighted feature maps through the glasses-removing model.

The glasses-removing model is a trained model and has a glasses-removing effect, and after processing by the plurality of convolution squeeze and excitation networks in the glasses-removing model and other network layers, a glasses-removed image corresponding to the target image is generated according to the weighted feature maps.

According to the image processing apparatus, a target image is obtained, and the target image is inputted to a glasses-removing model that is obtained through pre-training; because the glasses-removing model includes a plurality of sequentially connected convolution squeeze and excitation networks, feature maps of feature channels of the target image may be obtained through convolution layers of the convolution squeeze and excitation networks, then global information of the feature channels is obtained according to the feature maps through squeeze and excitation layers of the convolution squeeze and excitation networks, the global information is learned to generate weights of the feature channels, then the feature maps of the feature channels are weighted respectively according to the weights through weighting layers of the convolution squeeze and excitation networks, weighted feature maps are generated, and finally a corresponding glasses-removed image is obtained according to the weighted feature maps through the glasses-removing model. In this way, the glasses-removing model can keep a relatively high learning capability, and therefore can fully learn importance of different feature channels to obtain corresponding weights, to suppress ineffective or slightly effective features through weighting processing while enhancing effective features, effectively remove glasses in the target image, and ensure that a key feature of the target image can be restored from the glasses-removed image, thereby improving the restoration degree and authenticity of the glasses-removed image.

In an embodiment, the image processing apparatus further includes an image fusion module. In this embodiment, the image obtaining module 1401 is further configured to obtain a face image, a face in the face image wearing glasses; and perform division according to a location of an eye portion in the face image to obtain an eye portion image, and obtain the target image. The image fusion module is configured to fuse the face image and the glasses-removed image and obtain a glasses-removed face image.

In this embodiment, the image obtaining module 1401 performs target detection on the face image, determines a location of an eye portion in the face image, performs division based on the determined location to obtain an eye portion image, and takes the eye portion image obtained through division as the target image. After the glasses-removed image corresponding to the target image is generated through the glasses-removing model, the image fusion module fuses the face image and the glasses-removed image, and replaces the eye portion image at the determined location with the glasses-removed image, to obtain the complete glasses-removed face image.

In an embodiment, the image processing apparatus further includes a model training module, where the model training module further includes: a sample obtaining module, a generative sample module, a generative network loss coefficient generating module and an update and iteration module.

The sample obtaining module is configured to obtain a first training sample set formed by a first training image and a second training sample set formed by a second training image, an object in the first training image wearing glasses, and an object in the second training image wearing no glasses.

In this embodiment, each of the first training samples in the first training sample set and the second training samples in the second training sample set is a global face image. The second training sample may be the second training image obtained through various image obtaining means such as using an image library or archive, or obtained by replicating the existing second training image, and the first training sample may be obtained by performing glasses-adding processing on the second training sample; and the first training sample and the second training sample may alternatively be a large quantity of image samples captured by a face image capture device such as a camera.

The generative sample module is configured to input the first training sample set to a generative network model in the generative adversarial network and obtain a glasses-removed generative sample set, the generative network model including a plurality of sequentially connected convolution squeeze and excitation networks.

In a possible implementation, the first training samples in the first training sample set are sequentially inputted to a generative network model in a generative adversarial network, feature maps of feature channels of the first training samples are sequentially obtained through convolution layers of convolution squeeze and excitation networks in the generative network model, and the feature maps are inputted to squeeze and excitation layers of the convolution squeeze and excitation networks. Global information of the feature channels is obtained according to the feature maps through the squeeze and excitation layer, and the global information is learned, weights of the feature channels are generated; and further, the feature maps of the feature channels are weighted respectively according to the weights through weighting layers of the convolution squeeze and excitation networks, and weighted feature maps corresponding to the first training samples are generated. The weighted feature maps corresponding to the first training samples are further processed based on the generative network model, generative samples corresponding to the first training samples are finally generated, and all of the generative samples form the generative sample set.

The generative network loss coefficient generating module is configured to respectively input the generative sample set and the second training sample set to a discriminative network model in the generative adversarial network, and obtain a generative network loss coefficient according to an output of the discriminative network model.

In a possible implementation, the generative sample set and the second training sample set are inputted to the discriminative network model respectively in the generative adversarial network, and a parameter of the discriminative network model is adjusted according to an output of the discriminative network model, to obtain an updated discriminative network model; and then the generative sample set is inputted to the updated discriminative network model and the generative network loss coefficient is obtained according to an output of the updated discriminative network model, so as to adjust a parameter of the generative network model according to the generative network loss coefficient.

The update and iteration module is configured to update a parameter of the generative network model according to the generative network loss coefficient, obtain an updated generative network model, and return to the generative sample module; and take the updated generative network model as the glasses-removing model in a case that an iteration end condition is satisfied.

In this embodiment, the parameter of the generative network model is adjusted according to the generative network loss coefficient and a predetermined parameter adjustment method for the generative network model, to obtain the updated generative network model. If the preset iteration end condition is satisfied, the training iteration is ended, and the updated generative network model is taken as the glasses-removing model; otherwise, the generative sample module is triggered to continue to perform a related operation and the iteration is repeated.

In an embodiment, the update and iteration module is further configured to update a parameter of the generative network model according to the generative network loss coefficient and obtain an updated generative network model; obtain a current iteration count; trigger, if the iteration count is less than a preset iteration count threshold, the generative sample module to continue to perform a related operation and repeat the iteration; and take the updated generative network model as the glasses-removing model if the iteration count reaches the preset iteration count threshold.

Furthermore, the generative network loss coefficient generating module includes: a discriminative network loss coefficient generating module, a discriminative network update module and a generative network loss coefficient determining module.

The discriminative network loss coefficient generating module is configured to respectively input the generative sample set and the second training sample set to the discriminative network model in the generative adversarial network, and obtain a discriminative network loss coefficient according to the output of the discriminative network model.

In this embodiment, the discriminative network loss coefficient generating module is configured to respectively input the generative sample set and the second training sample set to the discriminative network model and obtain a first probability corresponding to the generative sample set and a second probability corresponding to the second training sample set; and obtain the discriminative network loss coefficient according to the first probability, the second probability, and a discriminative network loss function.

The discriminative network update module is configured to update a parameter of the discriminative network model according to the discriminative network loss coefficient and obtain an updated discriminative network model.

In this embodiment, the discriminative network update module adjusts the parameter of the discriminative network model according to the discriminative network loss coefficient and a predetermined parameter adjustment method for the discriminative network model, to obtain the updated discriminative network model. The parameter adjustment method for the discriminative network model includes, but is not limited to, error correction algorithms such as a gradient descent algorithm and a back propagation algorithm, for example, the Adam algorithm for optimizing a stochastic objective function based on a first-order gradient.

The generative network loss coefficient determining module is configured to input the generative sample set to the updated discriminative network model and obtain the generative network loss coefficient according to an output of the updated discriminative network model.

In an embodiment, the generative network loss coefficient determining module is configured to input the generative sample set to the updated discriminative network model and obtain a third probability corresponding to the generative sample set; and obtain the generative network loss coefficient according to the third probability and a generative network loss function.

In an embodiment, the image processing apparatus further includes a feature error generating module, configured to input the generative sample set and the second training sample set to a feature network model respectively and obtain a feature error between the generative sample set and the second training sample set. In this embodiment, the update and iteration module is further configured to update a parameter of the generative network model according to the generative network loss coefficient and the feature error and obtain an updated generative network model.

By analyzing the feature error between the generative samples in the generative sample set and the second training samples corresponding to the generative samples, the finally obtained glasses-removed image restored by the glasses-removing model further keeps discrimination information, thereby more accurately restoring the key feature of the target image, improving the restoration degree of the glasses-removed image, and ensuring the accuracy of facial recognition in a facial recognition application.

In an embodiment, the image processing apparatus further includes a pixel error generating module, configured to analyze pixels of the generative sample set and pixels of the second training sample set and obtain a pixel error between the generative sample set and the second training sample set. In this embodiment, the update and iteration module is further configured to update a parameter of the generative network model according to the generative network loss coefficient and the pixel error and obtain an updated generative network model.

The image processing apparatus fully learns, by using the glasses-removing model, importance of different feature channels to obtain corresponding weights, to suppress ineffective or slightly effective features through weighting processing while enhancing effective features, effectively remove glasses in the target image, and ensure that a key feature of the target image can be restored from the glasses-removed image, thereby improving the restoration degree and authenticity of the glasses-removed image.

Figure 15:
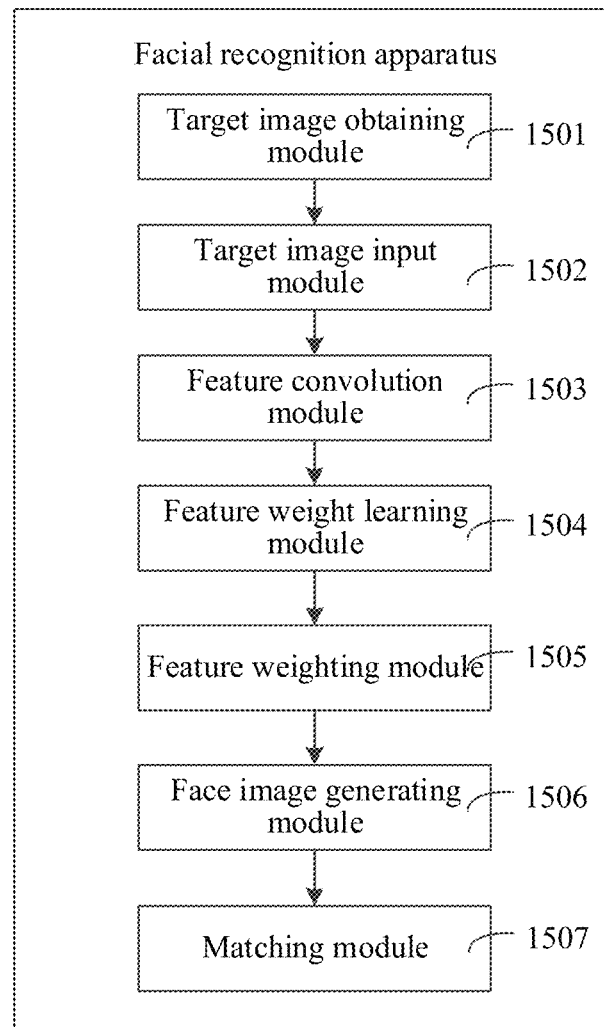
FIG. 15 is a structural block diagram of a facial recognition apparatus according to an embodiment.

In an embodiment, as shown in FIG. 15, a facial recognition apparatus is provided, including: a target image obtaining module 1501, a target image input module 1502, a feature convolution module 1503, a feature weight learning module 1504, a feature weighting module 1505, a face image generating module 1506, and a matching module 1507.

The target image obtaining module 1501 is configured to obtain a target image in a to-be-recognized face image, a face in the target image wearing glasses.

The to-be-recognized face image refers to a global face image that needs to be recognized. The target image obtaining module 1501 obtains a target image after glasses recognition and detection is performed on the to-be-recognized face image, or a pre-selected target image, so as to input the target image to the glasses-removing model for glasses-removing processing.

The target image input module 1502 is configured to input the target image to a glasses-removing model which is trained based on a generative adversarial network, the glasses-removing model including a plurality of sequentially connected convolution squeeze and excitation networks.

The feature convolution module 1503 is configured to obtain feature maps of feature channels of the target image through convolution layers of the convolution squeeze and excitation networks.

In a possible implementation, the feature convolution module 1503 is configured to perform convolution processing on the inputted target image through convolution layers of the convolution squeeze and excitation networks, obtain feature maps of feature channels of the target image, and input the feature maps to squeeze and excitation layers of the convolution squeeze and excitation networks.

The feature weight learning module 1504 is configured to obtain global information of the feature channels according to the feature maps through squeeze and excitation layers of the convolution squeeze and excitation networks, learn the global information, and generate weights of the feature channels. In a possible implementation, the feature maps are compressed through the squeeze layer in the squeeze and excitation layer, to obtain the global information of the feature channels; and the global information is learned through the excitation layer in the squeeze and excitation layer, to generate weights of the feature channels.

The feature weighting module 1505 is configured to respectively weight the feature maps of the feature channels according to the weights through weighting layers of the convolution squeeze and excitation networks, and generate weighted feature maps. In a possible implementation, the feature weighting module 1505 multiplies the feature maps of the feature channels by the corresponding weights respectively by using the weighting layer, to generate weighted feature maps, and the weighted feature maps continue to be inputted to a next-layer network for processing.

The face image generating module 1506 is configured to obtain a glasses-removed face image corresponding to the target image according to the weighted feature maps through the glasses-removing model. The glasses-removed face image refers to a global face image that corresponds to the target image and that is obtained after glasses are removed. When the target image is a global face image, the glasses-removed face image refers to an image obtained after glasses are removed from the target image; and when the target image is a local eye portion image, the glasses-removed face image refers to a face image obtained by fusing the glasses-removed target image and the to-be-recognized face image corresponding to the target image.

The matching module 1507 is configured to perform matching between the glasses-removed face image and a preset face image library and generate a facial recognition result according to a matching result. In this embodiment, the matching module 1507 performs matching between the glasses-removed face image and the preset face image library through the conventional facial recognition model, to obtain a matching result, and generates the facial recognition result according to the matching result.

The facial recognition apparatus removes the glasses in the to-be-recognized face image through the glasses-removing model without the need to manually taking off the glasses and then performing face image capture and facial recognition, thereby improving facial recognition efficiency and avoiding the problem that recognition cannot be performed due to interference from the glasses. Moreover, the glasses-removing model formed by a plurality of convolution squeeze and excitation networks can enhance the effective features of the target image, suppress the ineffective or slightly effective features, effectively remove glasses in the target image, and ensure that the glasses-removed image can restore the key feature of the target image, thereby improving the restoration degree and authenticity of the glasses-removed image and further ensuring the accuracy of the facial recognition result.

In an embodiment, the target image obtaining module 1501 includes a face image obtaining module, a glasses detection module and a target image determining module. The face image obtaining module is configured to obtain a to-be-recognized face image; the glasses detection module is configured to perform glasses recognition and detection on the to-be-recognized face image to detect whether the face image wearing glasses; and the target image determining module is configured to obtain the target image wearing glasses according to a result of the glasses recognition and detection.

In an embodiment, the target image determining module includes an eye portion division module, where the eye portion division module is configured to perform, in a case of detecting that a face in the to-be-recognized face image wears glasses, division according to a location of an eye portion in the to-be-recognized face image to obtain an eye portion image, and obtain the target image wearing the glasses. Correspondingly, in this embodiment, the face image generating module 1506 is further configured to generate the glasses-removed image corresponding to the target image through the glasses-removing model; and fuse the to-be-recognized face image and the glasses-removed image and obtain the glasses-removed face image.

In an embodiment, the facial recognition apparatus further includes a model training module, where the model training module further includes: a sample obtaining module, a generative sample module, a generative network loss coefficient generating module and an update and iteration module. Reference is made to the description of the embodiment shown in FIG. 14 for details that are not described herein.

In an embodiment, the generative network loss coefficient generating module includes: a discriminative network loss coefficient generating module, a discriminative network update module and a generative network loss coefficient determining module. Reference is made to the description of the embodiment shown in FIG. 14 for details that are not described herein.

In an embodiment, the facial recognition apparatus further includes at least one of a feature error generating module and a pixel error generating module. Reference is made to the description of the embodiment shown in FIG. 14 for details that are not described herein.

The facial recognition apparatus removes the glasses in the to-be-recognized face image through the glasses-removing model without manually taking off the glasses and then performing face image capture and facial recognition, thereby improving facial recognition efficiency and avoiding the problem that recognition cannot be performed due to interference from the glasses.

Figure 16:
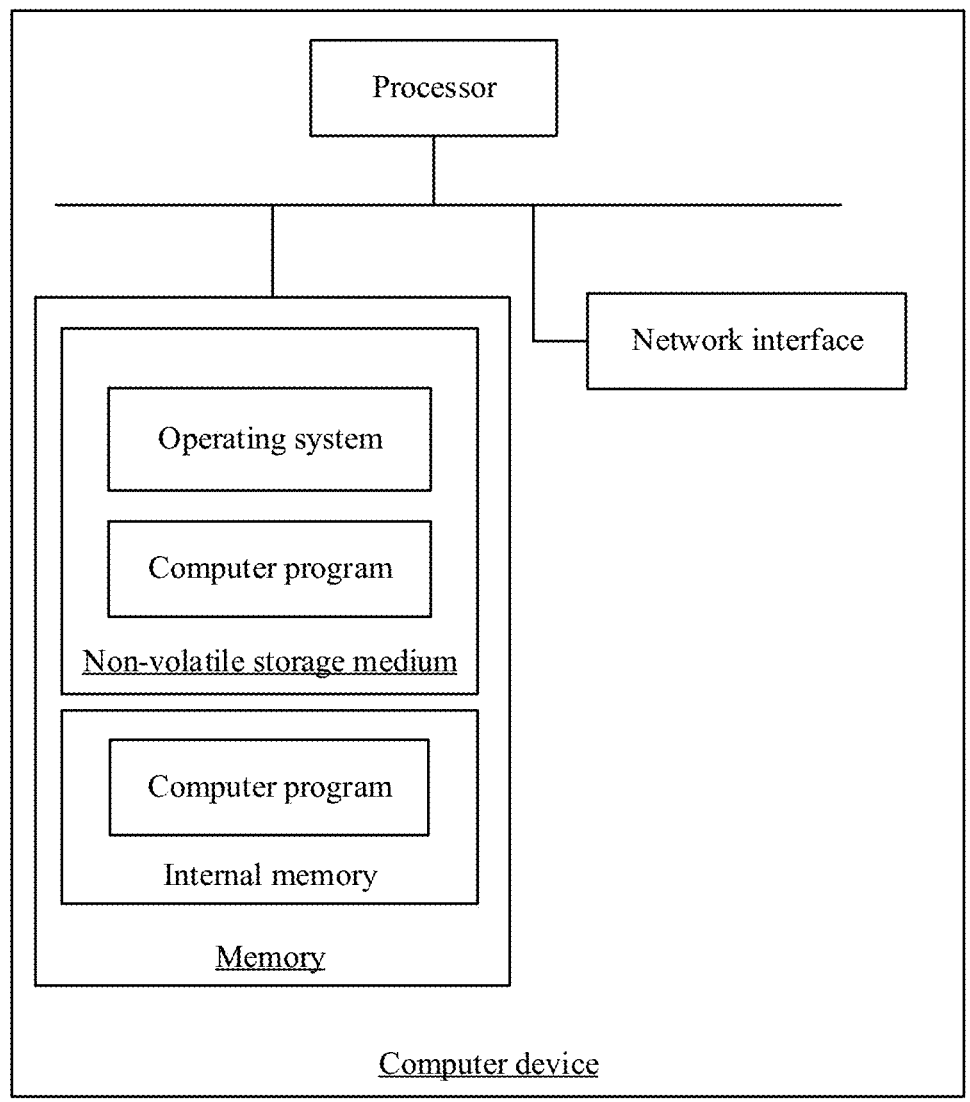
FIG. 16 is a structural block diagram of a computer device according to an embodiment.

FIG. 16 is a diagram of an internal structure of a computer device according to an embodiment. The computer device may be the terminal or server 110 in FIG. 1. As shown in FIG. 16, the computer device includes a processor, a memory, and a network interface connected by using a system bus. The memory includes a non-volatile storage medium and an internal memory. The non-volatile storage medium of the computer device stores an operating system, and may further store a computer program. When executed by the processor, the computer program may cause the processor to perform the image processing method and/or facial recognition method. The internal memory may also store a computer program. When executed by the processor, the computer program may cause the processor to perform the image processing method and/or facial recognition method.

A person skilled in the art may understand that, the structure shown in FIG. 16 is only a block diagram of a part of a structure related to a solution of this application and does not limit the computer device to which the solution of this application is applied. Specifically, the computer device may include more or fewer members than those in FIG. 16, or include a combination of some members, or include different member layouts.

In an embodiment, the image processing apparatus and the facial recognition apparatus provided in this application may be implemented in the form of a computer program. The computer program may be run on the computer device shown in FIG. 16. The memory of the computer device may store program modules forming the image processing apparatus and/or the facial recognition apparatus, for example, the image obtaining module 1401, the input module 1402, the convolution module 1403, the weight learning module 1404, the weighting module 1405, and the generating module 1406 shown in FIG. 14. A computer program formed by the program modules causes the processor to perform the steps in the image processing method in the embodiments of this application described in this specification.

In an embodiment, a computer device is provided, including a memory and a processor, the memory storing a computer program, and the processor, when executing the computer program, implementing the image processing method in the foregoing embodiments.

In an embodiment, the processor, when executing the computer program, further implements the facial recognition method in the foregoing embodiments.

In an embodiment, a computer-readable storage medium is provided, storing a computer program, the computer program, when executed by a processor, implementing the image processing method in the foregoing embodiments.

In an embodiment, the computer program, when executed by the processor, further implements the facial recognition method in the foregoing embodiments.

A person of ordinary skill in the art may understand that all or some of the processes of the methods in the foregoing embodiments may be implemented by a computer program instructing relevant hardware. The program may be stored in a non-volatile computer-readable storage medium. When the program runs, the processes of the foregoing methods in the embodiments are performed. Any reference to a memory, storage, database or another medium used in the various embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. By way of illustration and not limitation, the RAM is available in a variety of forms, such as a static RAM (SRAM), a dynamic RAM (DRAM), a synchronous DRAM (SDRAM), a dual data rate SDRAM (DDR SDRAM), an enhanced SDRAM (ESDRAIVI), a synchronization link (Synchlink) DRAM (SLDRAM), a memory Bus (Rambus) direct RAM (RDRAM), a direct memory bus dynamic RAM (DRDRAM), and a memory bus dynamic RAM (RDRAM).

The technical features in the foregoing embodiments may be randomly combined. For concise description, not all possible combinations of the technical features in the embodiment are described. However, the combinations of the technical features are to be all be considered as falling within the scope described in this specification provided that they do not conflict with each other.

The foregoing embodiments show only several implementations of this application, and descriptions thereof are in detail, but shall not be understood as limiting the patent scope of this application. A person of ordinary skill in the art may make various changes and improvements without departing from the ideas of this application, which shall all fall within the protection scope of this application. Therefore, the protection scope of the patent of this application shall be subject to the appended claims.

What is claimed is:

1. An image processing method, comprising:
    obtaining a target image comprising an object wearing glasses;
    normalizing the target image from an original image pixel size and an original pixel value range to a predetermined target image pixel size and a predetermined target pixel value range;
    inputting the normalized target image to a glasses-removing model trained based on a generative adversarial network and comprising a plurality of sequentially connected convolution squeeze and excitation networks;
    obtaining feature maps of feature channels of the normalized target image through convolution layers of the convolution squeeze and excitation networks;
    obtaining global information of the feature channels according to the feature maps through squeeze and excitation layers of the convolution squeeze and excitation networks, learning the global information, and generating weights of the feature channels;
    weighting the feature maps of the feature channels according to the weights through weighting layers of the convolution squeeze and excitation networks, respectively, and generating weighted feature maps;
    generating a glasses-removed image corresponding to the target image according to the weighted feature maps through the glasses-removing model; and
    restoring the glasses-removed image from the predetermined target image pixel size and the predetermined target pixel value range to the original image pixel size and the original pixel value range.

2. The method according to claim 1, wherein the glasses-removing model is trained by:
    obtaining a first training sample set formed by at least one first training image and a second training sample set formed by at least one second training image, an object in the at least one first training image wearing glasses, and an object in the at least one second training image wearing no glasses;
    performing an iteration comprising:
        inputting the first training sample set to a generative network model in the generative adversarial network to obtain a glasses-removed generative sample set;
        inputting the glasses-removed generative sample set and the second training sample set to a discriminative network model in the generative adversarial network, and obtaining a generative network loss coefficient according to an output of the discriminative network model; and
        updating a parameter of the generative network model according to the generative network loss coefficient to obtain an updated generative network model, and if the iteration satisfies an end condition, then using the updated generative network model as the glasses-removing model and ending the iteration, otherwise repeating the iteration.

3. The method according to claim 2, wherein inputting the glasses-removed generative sample set and the second training sample set to the discriminative network model in the generative adversarial network comprises:
    inputting the glasses-removed generative sample set and the second training sample set to the discriminative network model in the generative adversarial network, and obtaining a discriminative network loss coefficient according to the output of the discriminative network model;
    updating a parameter of the discriminative network model according to the discriminative network loss coefficient and obtaining an updated discriminative network model; and
    inputting the glasses-removed generative sample set to the updated discriminative network model and obtaining the generative network loss coefficient according to an output of the updated discriminative network model.

4. The method according to claim 3, wherein inputting the glasses-removed generative sample set and the second training sample set to the discriminative network model in the generative adversarial network, and obtaining a discriminative network loss coefficient according to the output of the discriminative network model comprises:
inputting the generative sample set and the second training sample set to the discriminative network model and obtaining a first probability corresponding to the generative sample set and a second probability corresponding to the second training sample set; and
obtaining the discriminative network loss coefficient according to the first probability, the second probability, and a discriminative network loss function.

5. The method according to claim 3, wherein inputting the glasses-removed generative sample set to the updated discriminative network model comprises:
inputting the glasses-removed generative sample set to the updated discriminative network model and obtaining a third probability corresponding to the glasses-removed generative sample set; and
obtaining the generative network loss coefficient according to the third probability and a generative network loss function.

6. The method according to claim 2, wherein:
before updating the parameter of the generative network model, the method further comprises:
inputting the glasses-removed generative sample set and the second training sample set to a feature network model and obtaining a feature error between the glasses-removed generative sample set and the second training sample set; and
updating the parameter of the generative network model according to the generative network loss coefficient to obtain the updated generative network model comprises:
updating the parameter of the generative network model according to the generative network loss coefficient and the feature error to obtain the updated generative network model.

7. The method according to claim 2, wherein:
before updating the parameter of the generative network model, the method further comprises:
analyzing a pixel of the glasses-removed generative sample set and pixels of the second training sample set and obtaining a pixel error between the glasses-removed generative sample set and the second training sample set; and
updating the parameter of the generative network model according to the generative network loss coefficient to obtain the updated generative network model comprises:
updating the parameter of the generative network model according to the generative network loss coefficient and the pixel error to obtain the updated generative network model.

8. The method according to claim 2, wherein the end condition comprises a number of the iteration reaching a preset iteration count threshold.

9. The method according to claim 1, wherein:
obtaining the target image comprises:
obtaining a face image, a face in the face image wearing glasses; and
performing division according to a location of an eye portion in the face image to obtain an eye portion image, and obtaining the target image; and
the method further comprises:
fusing the face image and the glasses-removed image to obtain a glasses-removed face image.

10. A facial recognition method, comprising:
obtaining a target image from a to-be-recognized face image, a face in the target image wearing glasses;
normalize the target image from an original image pixel size and an original pixel value range to a predetermined target image pixel size and a predetermined target pixel value range;
inputting the normalized target image to a glasses-removing model trained based on a generative adversarial network and comprising a plurality of sequentially connected convolution squeeze and excitation networks;
obtaining feature maps of feature channels of the normalized target image through convolution layers of the convolution squeeze and excitation networks;
obtaining global information of the feature channels according to the feature maps through squeeze and excitation layers of the convolution squeeze and excitation networks, learning the global information, and generating weights of the feature channels;
weighting the feature maps of the feature channels according to the weights through weighting layers of the convolution squeeze and excitation networks, respectively, and generating weighted feature maps;
obtaining a glasses-removed face image corresponding to the target image according to the weighted feature maps through the glasses-removing model;
restore the glasses-removed image from the predetermined target image pixel size and the predetermined target pixel value range to the original image pixel size and the original pixel value range; and
performing matching between the glasses-removed face image and a predetermined face image library to generate a matching result and generating a facial recognition result according to the matching result.

11. The method according to claim 10, wherein obtaining the target image from the to-be-recognized face image comprises:
obtaining a to-be-recognized face image;
performing glasses recognition and detection on the to-be-recognized face image; and
obtaining the target image according to a result of the glasses recognition and detection.

12. The method according to claim 11, wherein:
obtaining the target image according to the result of the glasses recognition and detection comprises:
in response to detecting that a face in the to-be-recognized face image wears glasses, performing division according to a location of an eye portion in the to-be-recognized face image to obtain an eye portion image to obtain the target image; and
obtaining the glasses-removed face image corresponding to the target image according to the weighted feature maps through the glasses-removing model comprises:
generating the glasses-removed image corresponding to the target image according to the weighted feature maps through the glasses-removing model; and
fusing the to-be-recognized face image and the glasses-removed image and obtaining the glasses-removed face image.

13. The method according to claim 10, wherein a manner of training the glasses-removing model comprises:
obtaining a first training sample set formed by at least one first training image and a second training sample set formed by at least one second training image, an object in the at least one first training image wearing glasses, and an object in the at least one second training image wearing no glasses;

performing an iteration comprising:

inputting the glasses-removed generative sample set and the second training sample set to a discriminative network model in the generative adversarial network, and obtaining a generative network loss coefficient according to an output of the discriminative network model; and updating a parameter of the generative network model according to the generative network loss coefficient to obtain an updated generative network model, if the iteration satisfies an end condition, then using the updated generative network model as the glasses-removing model and ending the iteration, otherwise repeating the iteration.

14. The method according to claim 13, wherein inputting the glasses-removed generative sample set and the second training sample set to the discriminative network model in the generative adversarial network comprises:

inputting the glasses-removed generative sample set and the second training sample set to the discriminative network model in the generative adversarial network, respectively, and obtaining a discriminative network loss coefficient according to the output of the discriminative network model;

updating a parameter of the discriminative network model according to the discriminative network loss coefficient and obtaining an updated discriminative network model; and inputting the glasses-removed generative sample set to the updated discriminative network model and obtaining the generative network loss coefficient according to an output of the updated discriminative network model.

15. The method according to claim 14, wherein inputting the glasses-removed generative sample set and the second training sample set to the discriminative network model in the generative adversarial network, and obtaining a discriminative network loss coefficient according to the output of the discriminative network model comprises:

inputting the glasses-removed generative sample set and the second training sample set to the discriminative network model and obtaining a first probability corresponding to the glasses-removed generative sample set and a second probability corresponding to the second training sample set; and obtaining the discriminative network loss coefficient according to the first probability, the second probability, and a discriminative network loss function.

16. The method according to claim 14, wherein inputting the glasses-removed generative sample set to the updated discriminative network model comprises:

inputting the glasses-removed generative sample set to the updated discriminative network model and obtaining a third probability corresponding to the glasses-removed generative sample set; and obtaining the generative network loss coefficient according to the third probability and a generative network loss function.

17. The method according to claim 13, wherein:

before updating the parameter of the generative network model, the method further comprises:

inputting the glasses-removed generative sample set and the second training sample set to a feature network model and obtaining a feature error between the glasses-removed generative sample set and the second training sample set; and updating the parameter of the generative network model according to the generative network loss coefficient to obtain the updated generative network model comprises:

updating the parameter of the generative network model according to the generative network loss coefficient and the feature error to obtain the updated generative network model.

18. The method according to claim 13, wherein:

before the updating the parameter of the generative network model, the method further comprises:

analyzing a pixel of the glasses-removed generative sample set and a pixel of the second training sample set and obtaining a pixel error between the glasses-removed generative sample set and the second training sample set; and updating the parameter of the generative network model according to the generative network loss coefficient to obtain the updated generative network model comprises:

updating the parameter of the generative network model according to the generative network loss coefficient and the pixel error to obtain the updated generative network model.

19. The method according to claim 13, wherein the end condition comprises a number of the iteration.

20. An apparatus for image processing, comprising a memory for storing computer readable instructions and a processor in communication with the memory, wherein the processor is configured to execute the computer readable instructions to cause the apparatus to:

obtain a target image comprising an object wearing glasses;

normalize the target image from an original image pixel size and an original pixel value range to a predetermined target image pixel size and a predetermined target pixel value range;

input the normalized target image to a glasses-removing model trained based on a generative adversarial network and comprising a plurality of sequentially connected convolution squeeze and excitation networks;

obtain feature maps of feature channels of the normalized target image through convolution layers of the convolution squeeze and excitation networks;

obtain global information of the feature channels according to the feature maps through squeeze and excitation layers of the convolution squeeze and excitation networks, learn the global information, and generate weights of the feature channels;

weight the feature maps of the feature channels according to the weights through weighting layers of the convolution squeeze and excitation networks, respectively, and generate weighted feature maps;

generate a glasses-removed image corresponding to the target image according to the weighted feature maps through the glasses-removing model; and restore the glasses-removed image from the predetermined target image pixel size and the predetermined target pixel value range to the original image pixel size and the original pixel value range.

* * * * *